(12) United States Patent
Wang et al.

(10) Patent No.: US 11,812,413 B2
(45) Date of Patent: Nov. 7, 2023

(54) RESERVED RESOURCE INDICATION FOR SIDELINK SYSTEMS

(71) Applicant: QUALCOMM Incorporated, San Diego, CA (US)

(72) Inventors: Xiaojie Wang, Hillsborough, NJ (US); Juan Montojo, San Diego, CA (US); Hua Wang, Basking Ridge, NJ (US); Sony Akkarakaran, Poway, CA (US); Jing Sun, San Diego, CA (US); Xiaoxia Zhang, San Diego, CA (US); Tao Luo, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 212 days.

(21) Appl. No.: 17/308,907

(22) Filed: May 5, 2021

(65) Prior Publication Data
US 2022/0361146 A1   Nov. 10, 2022

(51) Int. Cl.
*H04W 72/02* (2009.01)
*H04W 72/0446* (2023.01)
*H04W 72/0453* (2023.01)
*H04W 72/1263* (2023.01)
*H04W 72/20* (2023.01)
*H04W 72/50* (2023.01)

(52) U.S. Cl.
CPC ....... *H04W 72/02* (2013.01); *H04W 72/0446* (2013.01); *H04W 72/0453* (2013.01); *H04W 72/1263* (2013.01); *H04W 72/20* (2023.01); *H04W 72/535* (2023.01)

(58) Field of Classification Search
CPC ... H04W 72/02; H04W 72/20; H04W 72/535; H04W 72/0446; H04W 72/0453; H04W 72/1263
USPC ........................................................ 370/329
See application file for complete search history.

(56) References Cited

U.S. PATENT DOCUMENTS

| 2015/0215842 A1* | 7/2015 | Lim | H04W 74/0833 370/329 |
|---|---|---|---|
| 2017/0156143 A1* | 6/2017 | Chang | H04B 17/336 |
| 2021/0144750 A1* | 5/2021 | Cao | H04W 72/23 |

(Continued)

FOREIGN PATENT DOCUMENTS

WO   WO-2021034124 A1 *   2/2021   ........... H04L 1/1812

*Primary Examiner* — Intekhaab A Siddiquee
(74) *Attorney, Agent, or Firm* — Holland & Hart LLP

(57) ABSTRACT

Methods, systems, and devices for wireless communications are described. One or more user equipments (UEs) may support reserved resource indications for sidelink systems. In some examples, a first UE may transmit a first sidelink control message to at least a second UE in a first transmission time interval (TTI), which may schedule a first set of time-frequency resources for a sidelink message. The first UE may transmit the sidelink message to the second UE using the first set of time frequency resources. After transmitting the sidelink message, the first UE may transmit a second sidelink control message to the second UE in a second TTI, which may indicate the first set of time-frequency resources used for transmission of the sidelink message. In some examples, the second UE may perform a decoding procedure for the sidelink message based on the second sidelink control message.

30 Claims, 14 Drawing Sheets

(56) References Cited

U.S. PATENT DOCUMENTS

2022/0338067 A1\* 10/2022 Lee ........................ H04W 4/40
2022/0394735 A1\* 12/2022 Lee ................... H04W 72/1263

\* cited by examiner

RESERVED RESOURCE INDICATION FOR SIDELINK SYSTEMS

FIELD OF TECHNOLOGY

The following relates to wireless communications, including reserved resource indication for sidelink systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, one or more UEs may reserve resources for sidelink communications. In some examples, a UE may indicate future reserved resources to a receiving UE. Such indications, however, may not account for interference in the resources, and as such, may lead to decoding errors or an inefficient use of network resources.

SUMMARY

The described techniques relate to improved methods, systems, devices, and apparatuses that support reserved resource indication for sidelink systems. Generally, the described techniques enable a user equipment (UE) to indicate reserved resources for sidelink systems. In some cases, a transmitting UE may indicate resources for one or more previous sidelink transmissions. The transmitting UE may schedule a sidelink message for a receiving UE, and may transmit the scheduled sidelink message over a set of time-frequency resources indicated by sidelink control information (SCI) (e.g., including in SCI-1, SCI-2, or both). After transmitting the sidelink message, the transmitting UE may schedule a second sidelink message for the receiving UE, which may be a repetition or a retransmission of the transmitted sidelink message. The second sidelink message may be scheduled via SCI-1, SCI-2, or both, and may include an indication of the resources that may have been previously used for transmitting the first sidelink message. This indication may be in addition, or in lieu of, an indication of future resources, which may be sent in the first SCI. In some cases, the indication may also include a redundancy version identifier (RV-ID) associated with the previously used resources, which may indicate a retransmission ID for the sidelink message.

Additionally, or alternatively, the transmitting UE may transmit a bitmap to the receiving UE which may indicate each subchannel of the previously used resources and a corresponding interference level for each subchannel. In some cases, based on the resource indication, the bitmap, or both, the receiving UE may buffer each received data packet in resources reserved by the first SCI even if the first SCI may not be decodable. In some cases, the receiving UE may use the buffered packets for soft combining (e.g., based on the bitmap or RV-ID), which may improve network efficiency and the use of network resources.

A method for wireless communications at a first UE is described. The method may include transmitting, in a first transmission time interval (TTI), a first sidelink control message to at least a second UE, the first sidelink control message scheduling a first set of time-frequency resources for a sidelink message for the second UE, transmitting the sidelink message to the second UE using the first set of time-frequency resources based on the first sidelink control message, and transmitting, in a second TTI and after transmitting the sidelink message, a second sidelink control message to the second UE, the second sidelink control message indicating the first set of time-frequency resources used for transmission of the sidelink message to the second UE.

An apparatus for wireless communications at a first UE is described. The apparatus may include a processor, memory coupled with the processor, and instructions stored in the memory. The instructions may be executable by the processor to cause the apparatus to transmit, in a first TTI, a first sidelink control message to at least a second UE, the first sidelink control message scheduling a first set of time-frequency resources for a sidelink message for the second UE, transmit the sidelink message to the second UE using the first set of time-frequency resources based on the first sidelink control message, and transmit, in a second TTI and after transmitting the sidelink message, a second sidelink control message to the second UE, the second sidelink control message indicating the first set of time-frequency resources used for transmission of the sidelink message to the second UE.

Another apparatus for wireless communications at a first UE is described. The apparatus may include means for transmitting, in a first TTI, a first sidelink control message to at least a second UE, the first sidelink control message scheduling a first set of time-frequency resources for a sidelink message for the second UE, means for transmitting the sidelink message to the second UE using the first set of time-frequency resources based on the first sidelink control message, and means for transmitting, in a second TTI and after transmitting the sidelink message, a second sidelink control message to the second UE, the second sidelink control message indicating the first set of time-frequency resources used for transmission of the sidelink message to the second UE.

A non-transitory computer-readable medium storing code for wireless communications at a first UE is described. The code may include instructions executable by a processor to transmit, in a first TTI, a first sidelink control message to at least a second UE, the first sidelink control message scheduling a first set of time-frequency resources for a sidelink message for the second UE, transmit the sidelink message to the second UE using the first set of time-frequency resources based on the first sidelink control message, and transmit, in a second TTI and after transmitting the sidelink message, a second sidelink control message to the second UE, the second sidelink control message indicating the first set of time-frequency resources used for transmission of the sidelink message to the second UE.

In some examples of the method, apparatuses, and non-transitory computer-readable medium described herein, transmitting the second sidelink control message may include operations, features, means, or instructions for transmitting an indication of a first time offset in a field of the second sidelink control message, where the first time offset indicates that the first set of time-frequency resources occur before the second TTI.

In some examples of the method, apparatuses, and non-transitory computer-readable medium described herein, transmitting the second sidelink control message may include operations, features, means, or instructions for transmitting an indication of a second time offset in the field of the second sidelink control message, where the second time offset indicates a second set of time-frequency resources that occur after the second TTI.

In some examples of the method, apparatuses, and non-transitory computer-readable medium described herein, transmitting the second sidelink control message may include operations, features, means, or instructions for transmitting an indication of a second time offset in the field of the second sidelink control message, where the second time offset indicates a second set of time-frequency resources that occur before the second TTI.

In some examples of the method, apparatuses, and non-transitory computer-readable medium described herein, the second set of time-frequency resources occur before the first set of time-frequency resources.

In some examples of the method, apparatuses, and non-transitory computer-readable medium described herein, transmitting the second sidelink control message may include operations, features, means, or instructions for transmitting an indication of a second time offset in the field of the second sidelink control message, where the second time offset indicates a second set of time-frequency resources that occur during the second TTI.

Some examples of the method, apparatuses, and non-transitory computer-readable medium described herein may further include operations, features, means, or instructions for transmitting one or more additional fields in first stage control information or second stage control information of the first sidelink control message, the one or more additional fields indicating a range for a first time offset or a range for a second time offset, the first time offset corresponding to the first set of time-frequency resources and the second time offset corresponding to a second set of time-frequency resources different from the first set of time-frequency resources.

Some examples of the method, apparatuses, and non-transitory computer-readable medium described herein may further include operations, features, means, or instructions for transmitting one or more additional fields in first stage control information or second stage control information of the first sidelink control message or the second sidelink control message, the one or more additional fields indicating a location of the first set of time-frequency resources or a second set of time-frequency resources different from the first set of time-frequency resources.

In some examples of the method, apparatuses, and non-transitory computer-readable medium described herein, the one or more additional fields includes an index corresponding to the location.

Some examples of the method, apparatuses, and non-transitory computer-readable medium described herein may further include operations, features, means, or instructions for transmitting signaling indicating a range for a first time offset or a range for a second time offset, the first time offset corresponding to the first set of time-frequency resources and the second time offset corresponding to a second set of time-frequency resources different from the first set of time-frequency resources.

In some examples of the method, apparatuses, and non-transitory computer-readable medium described herein, the signaling includes radio resource control (RRC) signaling or PC5 signaling.

Some examples of the method, apparatuses, and non-transitory computer-readable medium described herein may further include operations, features, means, or instructions for generating a set of bits for a time domain resource assignment field of the second sidelink control message, the set of bits indicative of a first time offset corresponding to the first set of time-frequency resources or a second time offset corresponding to a second set of time-frequency resources different from the first set of time-frequency resources.

Some examples of the method, apparatuses, and non-transitory computer-readable medium described herein may further include operations, features, means, or instructions for transmitting a bitmap corresponding to the first set of time-frequency resources, each bit of the bitmap indicating a respective interference level for a respective subchannel of the first set of time-frequency resources.

In some examples of the method, apparatuses, and non-transitory computer-readable medium described herein, the first set of time-frequency resources includes the first TTI and corresponding subchannels for the first TTI.

In some examples of the method, apparatuses, and non-transitory computer-readable medium described herein, transmitting the second sidelink control message may include operations, features, means, or instructions for transmitting an indication of a redundancy version identifier corresponding to the sidelink message and the first set of time-frequency resources used for transmission of the sidelink message to the second UE.

Some examples of the method, apparatuses, and non-transitory computer-readable medium described herein may further include operations, features, means, or instructions for transmitting, after the second sidelink control message, a third sidelink control message indicating the first set of time-frequency resources used for transmission of the sidelink message to the second UE.

In some examples of the method, apparatuses, and non-transitory computer-readable medium described herein, the third sidelink control message may be transmitted in a third TTI.

A method for wireless communications at a first UE is described. The method may include monitoring a first TTI for a first sidelink control message from a second UE, the first sidelink control message scheduling a first set of time-frequency resources for a sidelink message for the first UE, receiving, in a second TTI after the first TTI, a second sidelink control message from the second UE, the second sidelink control message indicating resources occurring before the second TTI and used for transmission of the sidelink message to the second UE, and performing a decoding procedure for the sidelink message based on the second sidelink control message.

An apparatus for wireless communications at a first UE is described. The apparatus may include a processor, memory coupled with the processor, and instructions stored in the memory. The instructions may be executable by the processor to cause the apparatus to monitor a first TTI for a first sidelink control message from a second UE, the first sidelink control message scheduling a first set of time-frequency resources for a sidelink message for the first UE, receive, in a second TTI after the first TTI, a second sidelink control message from the second UE, the second sidelink control message indicating resources occurring before the second TTI and used for transmission of the sidelink message to the second UE, and perform a decoding procedure for the sidelink message based on the second sidelink control message.

Another apparatus for wireless communications at a first UE is described. The apparatus may include means for monitoring a first TTI for a first sidelink control message from a second UE, the first sidelink control message scheduling a first set of time-frequency resources for a sidelink message for the first UE, means for receiving, in a second TTI after the first TTI, a second sidelink control message from the second UE, the second sidelink control message indicating resources occurring before the second TTI and used for transmission of the sidelink message to the second UE, and means for performing a decoding procedure for the sidelink message based on the second sidelink control message.

A non-transitory computer-readable medium storing code for wireless communications at a first UE is described. The code may include instructions executable by a processor to monitor a first TTI for a first sidelink control message from a second UE, the first sidelink control message scheduling a first set of time-frequency resources for a sidelink message for the first UE, receive, in a second TTI after the first TTI, a second sidelink control message from the second UE, the second sidelink control message indicating resources occurring before the second TTI and used for transmission of the sidelink message to the second UE, and perform a decoding procedure for the sidelink message based on the second sidelink control message.

Some examples of the method, apparatuses, and non-transitory computer-readable medium described herein may further include operations, features, means, or instructions for transmitting an indication of a buffering capability for the first UE and buffering the received sidelink message in the first set of time-frequency resources scheduled by the first sidelink control message based on the buffering capability.

In some examples of the method, apparatuses, and non-transitory computer-readable medium described herein, buffering the received sidelink message may include operations, features, means, or instructions for buffering the received sidelink message if the first sidelink control message may be not decoded in the first set of time-frequency resources.

Some examples of the method, apparatuses, and non-transitory computer-readable medium described herein may further include operations, features, means, or instructions for discarding log-likelihood ratios (LLRs) received in the first TTI and the second TTI that indicate interference above an interference threshold or canceled transmissions in the corresponding TTI.

In some examples of the method, apparatuses, and non-transitory computer-readable medium described herein, the LLRs may be calculated based on one or more bits that indicate a level of interference in the corresponding TTI.

In some examples of the method, apparatuses, and non-transitory computer-readable medium described herein, the LLRs may be calculated based on one or more scaling factors for the LLRs, the one or more scaling factors based on a level of interference in the corresponding TTI.

Some examples of the method, apparatuses, and non-transitory computer-readable medium described herein may further include operations, features, means, or instructions for performing soft combining of sidelink control messages in the second TTI based on the second TTI having interference below an interference threshold.

In some examples of the method, apparatuses, and non-transitory computer-readable medium described herein, receiving the second sidelink control message may include operations, features, means, or instructions for receiving an indication of a first time offset in a field of the second sidelink control message, where the first time offset indicates that the first set of time-frequency resources occur before the second TTI.

In some examples of the method, apparatuses, and non-transitory computer-readable medium described herein, receiving the second sidelink control message may include operations, features, means, or instructions for receiving an indication of a second time offset in the field of the second sidelink control message, where the second time offset indicates a second set of time-frequency resources that occur after the second TTI.

In some examples of the method, apparatuses, and non-transitory computer-readable medium described herein, receiving the second sidelink control message may include operations, features, means, or instructions for receiving an indication of a second time offset in the field of the second sidelink control message, where the second time offset indicates a second set of time-frequency resources that occur before the second TTI.

In some examples of the method, apparatuses, and non-transitory computer-readable medium described herein, the second set of time-frequency resources occur before the first set of time-frequency resources.

Some examples of the method, apparatuses, and non-transitory computer-readable medium described herein may further include operations, features, means, or instructions for receiving one or more additional fields in the first sidelink control message indicating a range for a first time offset or a range for a second time offset, the first time offset corresponding to the first set of time-frequency resources and the second time offset corresponding to a second set of time-frequency resources different from the first set of time-frequency resources.

Some examples of the method, apparatuses, and non-transitory computer-readable medium described herein may further include operations, features, means, or instructions for receiving one or more additional fields in the first sidelink control message or the second sidelink control message, the one or more additional fields indicating a location of the first set of time-frequency resources or a second set of time-frequency resources different from the first set of time-frequency resources.

In some examples of the method, apparatuses, and non-transitory computer-readable medium described herein, the one or more additional fields includes an index corresponding to the location.

Some examples of the method, apparatuses, and non-transitory computer-readable medium described herein may further include operations, features, means, or instructions for receiving signaling indicating a range for a first time offset or a range for a second time offset, the first time offset corresponding to the first set of time-frequency resources and the second time offset corresponding to a second set of time-frequency resources different from the first set of time-frequency resources.

In some examples of the method, apparatuses, and non-transitory computer-readable medium described herein, the signaling includes RRC signaling or PC5 signaling.

Some examples of the method, apparatuses, and non-transitory computer-readable medium described herein may further include operations, features, means, or instructions for receiving a bitmap corresponding to the first set of time-frequency resources, each bit of the bitmap indicating a respective interference level for a respective subchannel of the first set of time-frequency resources.

In some examples of the method, apparatuses, and non-transitory computer-readable medium described herein, the first set of time-frequency resources includes the first TTI and corresponding subchannels for the first TTI.

In some examples of the method, apparatuses, and non-transitory computer-readable medium described herein, receiving the second sidelink control message may include operations, features, means, or instructions for receiving an indication of a redundancy version identifier corresponding to the sidelink message and the first set of time-frequency resources used for transmission of the sidelink message to the second UE.

Some examples of the method, apparatuses, and non-transitory computer-readable medium described herein may further include operations, features, means, or instructions for receiving, after the second sidelink control message, a third sidelink control message indicating the first set of time-frequency resources used for transmission of the sidelink message to the second UE.

In some examples of the method, apparatuses, and non-transitory computer-readable medium described herein, the third sidelink control message may be transmitted in a third TTI.

DETAILED DESCRIPTION

Figure 1:
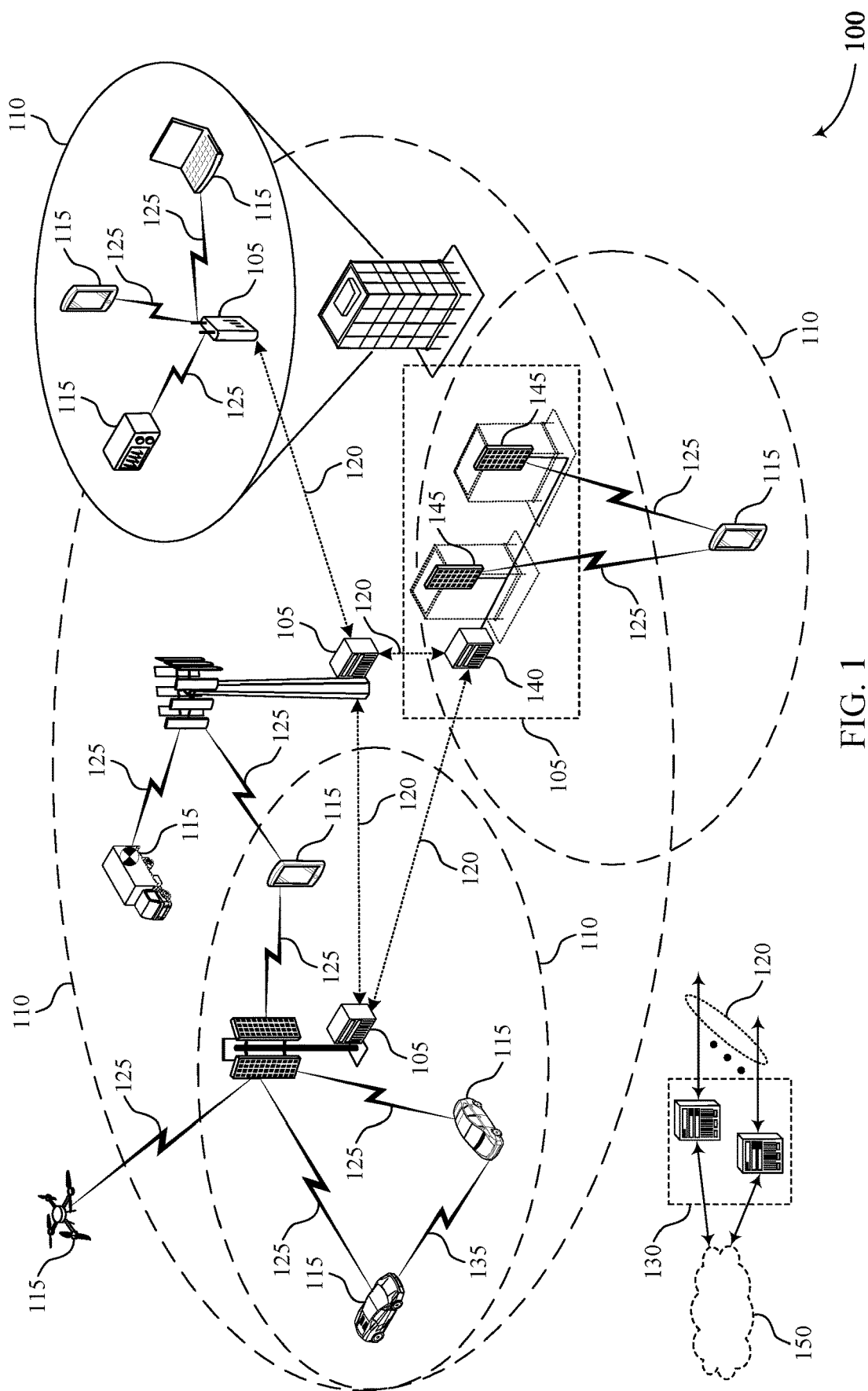
FIG. 1 illustrates an example of a wireless communications system that supports reserved resource indication for sidelink systems in accordance with aspects of the present disclosure.

A wireless communications system may support communication between one or more communication devices. For example, the wireless communications system may support sidelinks for communications between a user equipment (UE) and another UE). A sidelink may refer to any communication link between similar wireless devices (e.g., a communication link between UEs). It is noted that while various examples provided herein are discussed for UE sidelink devices, such sidelink techniques may be used for any type of wireless devices that use sidelink communications. For example, a sidelink may support one or more of device-to-device (D2D) communications, vehicle-to-everything (V2X) or vehicle-to-vehicle (V2V) communications, message relaying, discovery signaling, beacon signaling, or other signals transmitted over-the-air from one UE to one or more other UEs.

Sidelink communications may support communications within a group of UEs. For example, sidelink communications may include communications between a UE and one or more other UEs within a coverage area. In some examples, the coverage area may include the group of UEs (e.g., a coverage area provided by a base station, a coverage area outside of the coverage area provided by the base station, or a combination thereof). In some cases, a transmitting UE may schedule sidelink messages for a receiving UE using sidelink control information (SCI) in a two-stage SCI process. For example, the first stage SCI (e.g., SCI-1) may be broadcast by the transmitting UE to all UEs in the coverage area, and may indicate some scheduling information for a sidelink message for a receiving UE. The second stage SCI (e.g., SCI-2) may be sent by the transmitting UE to the receiving UE, and may indicate additional scheduling information for the sidelink message. In some cases, the SCI may include SCI-1, SCI-2, or both. In some cases, the receiving UE may decode the SCI-1 and the SCI-2 to identify all relevant scheduling information for the sidelink message, and then may monitor for the sidelink message from the transmitting UE based on the scheduling information.

To improve communication reliability, the SCI may also be used to indicate up to two sets of future resources that may be reserved by the transmitting UE (e.g., in the case of decoding failure) or repetitions of the sidelink message. In some cases, this may be indicated in a time domain resource allocation (TDRA) field of the SCI by time offsets x and y, each of which may have an associated time resource indicator value (TRIV) that may indicate which slot in the future is reserved relative to the slot in which the SCI is transmitted.

In some cases, there may be interference in the resources (e.g., in a subchannel or a slot) over which the SCI may be transmitted. Additionally, or alternatively, there may be interference in resources over which the sidelink message (e.g., the sidelink message scheduled by SCI) is transmitted. In cases where there is interference over SCI, the UE may discard the received data packet in the SCI, in which case the received data packet may be lost. In cases where interference is over resources used for the data packet, the UE may perform soft combining using the sidelink message (e.g., scheduled by SCI) that was subject to interference. In some cases, if the receiving UE combines the received data packet with other received data packets (e.g., as part of decoding multiple repetitions of the same sidelink message), the received data packet subject to interference may have the same weight as the other received data packets (e.g., which may not have been subject to interference). In some cases, combining in this way may lead to lost data packets or inefficient decoding as packets that experienced interference may be weighted the same as packets that did not experience, or experienced relatively low levels of, interference.

To enable more efficient use of sidelink communication resources, techniques for sidelink resource indications are described. In some cases, a transmitting UE may indicate resources for one or more previous transmissions. A receiving UE may use the indication of resources to determine whether to discard or combine data packets received via the indicated resources. In some cases, the UE may use the indication of resources as opposed to discarding data packets that may have been useful for combining, or combining data packets that may have been subject to interference at an equal weight with data packets that may not have been subject to interference.

In some cases, the transmitting UE may schedule a sidelink message for the receiving UE, and may transmit the scheduled sidelink message over a set of time-frequency resources indicated by the SCI (e.g., including in SCI-1, SCI-2, or both). After transmitting the sidelink message, the transmitting UE may schedule a second sidelink message for the receiving UE, which may be a repetition or a retransmission of the transmitted sidelink message. The second sidelink message may be scheduled via SCI-1, SCI-2, or both, and may include an indication of the resources that may have been previously used for transmitting the first sidelink message. This indication may be in addition, or in lieu of, an indication of future resources, which may be sent in the first SCI. In some cases, the indication may also include a redundancy version identifier (RV-ID) associated with the previously used resources, which may indicate a retransmission ID for the sidelink message.

In some cases, the transmitting UE may transmit a bitmap to the receiving UE which may indicate each subchannel of the previously used resources and a corresponding interference level for each subchannel. In some cases, based on the resource indication, the bitmap, or both, the receiving UE may buffer each received data packet in resources reserved by the first SCI (e.g., the SCI-1) even if the first SCI may not be decodable. In some cases, the receiving UE may use the buffered packets for soft combining (e.g., based on the bitmap or RV-ID), which may improve network efficiency and the use of network resources.

Aspects of the disclosure are initially described in the context of wireless communications systems. Aspects of the disclosure are then illustrated by and described with reference to resource configurations and a process flow. Aspects of the disclosure are further illustrated by and described with reference to apparatus diagrams, system diagrams, and flowcharts that relate to reserved resource indication for sidelink systems.

FIG. 1 illustrates an example of a wireless communications system 100 that supports reserved resource indication for sidelink systems in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_S=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband (NB) communications), or a combination of these techniques. For example, some UEs 115 may be configured for operation using an NB protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, the wireless communications system 100 may support sidelink communications between a group of UEs 115. For example, sidelink communications may include communications between a UE 115 and one or more other UEs 115 within a coverage area 110. In some examples, the coverage area 110 may include the group of UEs 115 (e.g., a coverage area 110 provided by a base station 105, a coverage area 110 outside of the coverage area 110 provided by the base station 105, or a combination thereof). In some cases, a transmitting UE 115 may schedule sidelink messages for a receiving UE 115 SCI in a two-stage SCI process. For example, the first stage SCI (e.g., SCI-1) may be broadcast by the transmitting UE 115 to all UEs 115 in the coverage area 110, and may indicate some scheduling information for a sidelink message. The second stage SCI (e.g., SCI-2) may be sent by the transmitting UE 115 directly to the receiving UE 115, and may indicate additional scheduling information for the sidelink message. In some cases, the SCI may include SCI-1, SCI-2, or both. In some cases, the receiving UE 115 may decode the SCI-1 and the SCI-2 to identify all relevant scheduling information for the sidelink message, and may monitor for the sidelink message from the transmitting UE 115 based on the scheduling information.

In some cases, to enable more efficient use of sidelink communication resources, the transmitting UE 115 may indicate resources for one or more previous transmissions. In some cases, the transmitting UE 115 may schedule a sidelink message for the receiving UE 115, and may transmit the scheduled sidelink message over a set of time-frequency resources indicated by the SCI (e.g., including in SCI-1, SCI-2, or both). After transmitting the sidelink message, the transmitting UE 115 may schedule a second sidelink message for the receiving UE 115, which may be a repetition or a retransmission of the transmitted sidelink message. The second sidelink message may be scheduled via SCI-1, SCI-2, or both, and may include an indication of the resources that may have been previously used for transmitting the first sidelink message. This indication may be in addition, or in lieu of, an indication of future resources, which may be sent in the first SCI. In some cases, the indication may also include a RV-ID associated with the previously used resources, which may indicate a retransmission ID for the sidelink message.

In some cases, the transmitting UE 115 may also transmit a bitmap to the receiving UE 115 which may indicate each subchannel of the previously used resources and a corresponding interference level for each subchannel. In some cases, based on the indication, the bitmap, or both, the receiving UE 115 may buffer each received data packet in resources reserved by the first SCI even if the first SCI is not decodable. In some cases, the receiving UE 115 may use the buffered packets for soft combining (e.g., based on the bitmap or RV-ID), which may improve network efficiency and the use of network resources.

In some cases, the SCI (e.g., which may include SCI-1, SCI-2, or both) may include resource reservations that may point to current, previous, or future time-frequency resources. For example, by transmitting an SCI in a subchannel, the transmitting UE 115 may indicate to the receiving UE 115 the bandwidth of the data channel (e.g., 2 subchannels). In some cases, using a TDRA field, the transmitting UE 115 may indicate to the receiving UE 115 how many future resources may be reserved for a retransmission of the data channel. In some cases, the reserved resources may be offset by an x and a y value, where $0<x\leq31$ and $x<y\leq31$. As such, the time offsets x and y are greater than zero. In some cases, the future resources may be indicated in the TDRA field of SCI by the time offsets x and y, each of which may have an associated TRIV field that may indicate which slot in the future is reserved relative to the slot in which the SCI-1 may be transmitted. In some examples, the TDRA may point to up to two slots in the future for retransmissions. For example, if the SCI is received in slot index 2, and x=2 and y=4, the slot indices 4 (e.g., slot index 2+x=slot index 4) and 6 (e.g., the slot index 2+y=slot index 6) may be reserved for future transmissions by the SCI. In some cases, the SCI transmitted in each reserved resource may point to different current and future resources. For example, an SCI transmitted in a resource with an index i may point to future resources with an index i+x, i+y, and so on. Techniques herein provide for negative offsets x and y such that one or more of the offset may be interpreted as a negative value. According to such techniques, previous resources may be indicated. For example, if the SCI is received in slot index 4, and x=2 and y=4, the slot indices 2 (e.g., slot index 4−x=slot index 2) and 0 (e.g., the slot index 4−y=slot index 0) may be indicated as resources used for a previous transmission to the receiving UE 115, which may have been scheduled by SCI in an earlier slot or may have been subject to interference.

Figure 2:
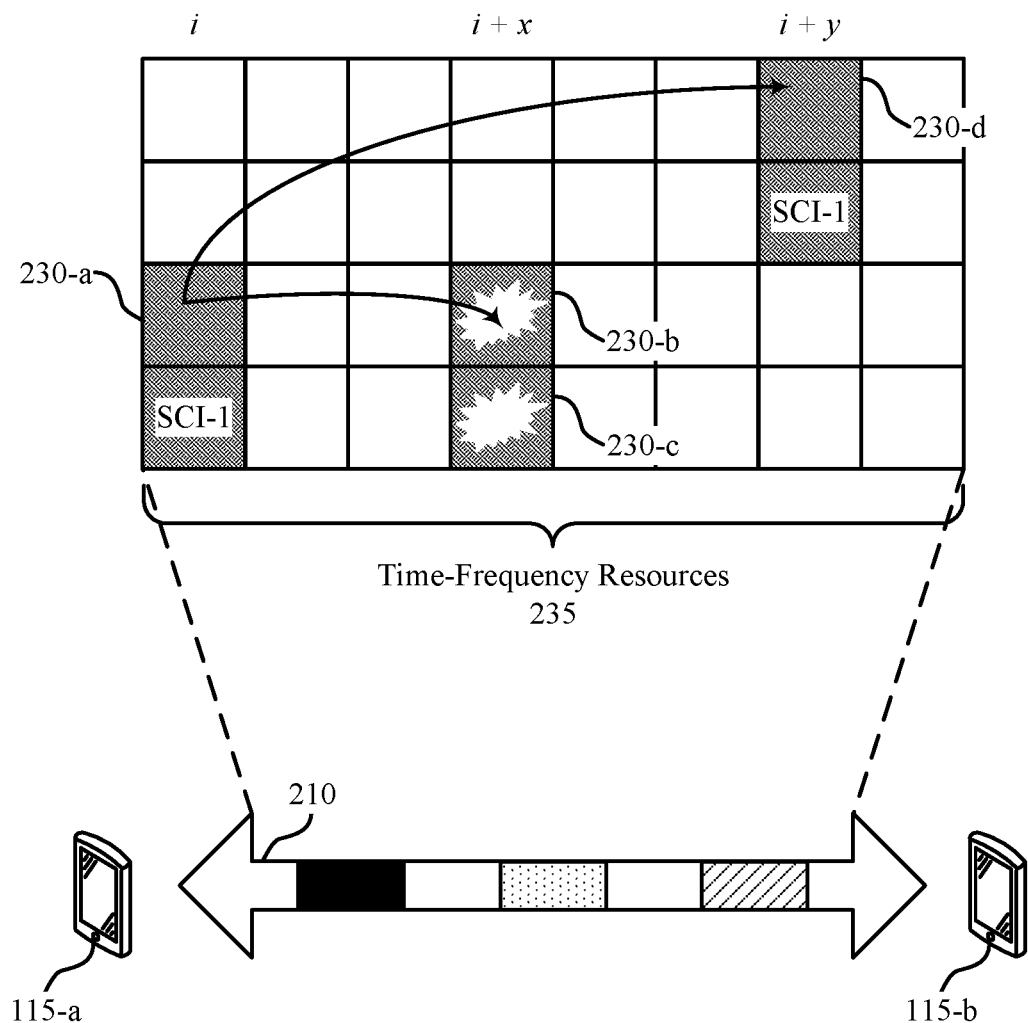
FIG. 2 illustrates an example of a wireless communications system that supports reserved resource indication for sidelink systems in accordance with aspects of the present disclosure.
Figure 2:
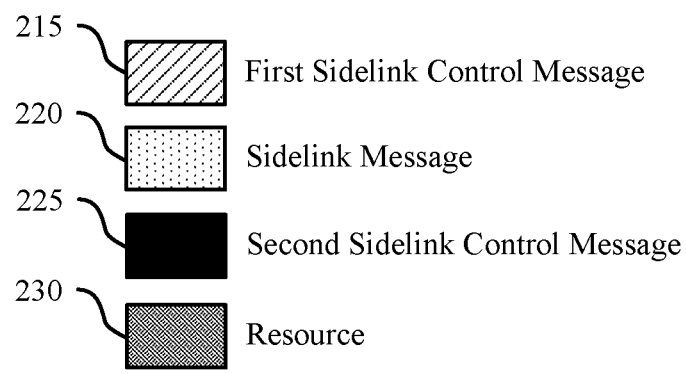

FIG. 2 illustrates an example of a wireless communications system 200 that supports reserved resource indication for sidelink systems in accordance with aspects of the present disclosure. In some examples, wireless communications system 200 may implement or be implemented by aspects of wireless communications system 100. For example, the wireless communications system 200 may include a UE 115-*a*, a UE 115-*b*, and a base station 105-*a*, which may be examples of the corresponding devices as described herein.

The wireless communications system 200 may support communications between one or more UEs 115 (e.g., via sidelink links). For example, the UE 115-*a* and the UE 115-*b* may communicate via a sidelink link 210. In some cases, a transmitting UE 115 (e.g., the UE 115-*a*) may schedule sidelink messages for a receiving UE 115 (e.g., the UE 115-*b*) using SCI in a two-stage SCI process. For example, the first stage SCI (e.g., SCI-1) may be broadcast by the transmitting UE 115-*a* to all UEs 115 in a coverage area (e.g., supported by a base station), and may indicate some scheduling information for a sidelink message. The second stage SCI (e.g., SCI-2) may be sent by the transmitting UE 115-*a* directly to the receiving UE 115-*b*, and may indicate additional scheduling information for the sidelink message. In some cases, the SCI may include SCI-1, SCI-2, or both. For example, an SCI-1 in a sidelink control message may be transmitted using a resource 230-*a*.

In some cases, the transmitting UE 115-*a* may transmit SCI in a sidelink control message which may include a set of time-frequency resources 235. The set of time-frequency resources 235 may include resources 230 (e.g., subchannels, slots) which may be used to transmit data packets over the sidelink link 210. In some cases, an SCI transmission may be damaged due to interference (such as NB interference). For example, multiple repetitions of a data packet may be transmitted using a resource 230-*a* in slot i and a resource 230-*b* in slot i+x. In some cases, the receiving UE 115-*b* may detect an SCI (e.g., the SCI-1) resource 230-*a* and a repetition of the SCI in the resource 230-*b*. If the receiving UE 115-*b* is unable to decode the data packet in the resource 230-*b* (e.g., because of NB interference), then the whole data packet may be discarded even if, in some cases, some part of the discarded data packet may still be useful for soft combining by the receiving UE 115-*b*. As such, the receiving UE 115-*b* may combine data transmissions, where the receiving UE 115-*b* may be able to decode the control channel. In some cases, the data transmission may be repeated in a resource 230-*d* in slot i+y to improve the decoding success by the receiving UE 115-*b*.

In some examples, NB interference may impact the resources 230 individually. Additionally, or alternatively, a resource 230 may be pre-empted by a higher priority UE 115 (not shown in FIG. 2). For example, even if the transmitting UE 115-*a* made a reservation in slot i indicating that it may have reserved the resource 230-*b* and a resource 230-*c* in the slot i+x, a higher priority UE 115 may indicate that it is using the resource 230-*c*, and the transmitting UE 115-*a* may cancel its transmission in the resource 230-*c*. However, using some techniques, the receiving UE 115-*b* may receive no indication of the canceled transmission or that the reserved resource 230 for the transmission may be experiencing high interference. In some cases, the SCI may still be decodable at the receiving UE 115-*b*, and the entire data packet in the SCI may be combined (e.g., processed) by the receiving UE 115-*b*. As such, the transmitting UE 115-*a* may transmit a repetition of the SCI to the resource 230-*d* in the slot i+y. In some cases, some part of the data packet may be useless, and discarding a partial data packet may be more beneficial to the receiving UE 115-*b* for decoding.

To enable more efficient use of sidelink communication resources, the transmitting UE 115-*a* may indicate resources for one or more previous transmissions, and the receiving UE 115-*b* may use the indication of resources to determine whether to discard or combine data packets received via the indicated resources 230. In some cases, the receiving UE 115-*b* may use the indication of resources 230 as opposed to discarding data packets that may have been useful for combining, or combining data packets that may have been subject to interference at an equal weight with data packets that may not have been subject to interference. In some examples, the transmitting UE 115-*a* may transmit a first sidelink control message 215 to the receiving UE 115-*b* to schedule a first set of time-frequency resources (e.g., the resources 230) for a sidelink message 220 for the receiving UE 115-*b*. In some cases, the first set of time-frequency resources may include a first TTI and corresponding subchannels for the first TTI. In some cases, the first sidelink control message 215 may include SCI (e.g., including in SCI-1, SCI-2, or both). In some cases, the transmitting UE 115-*a* may transmit the sidelink message 220 using the first set of time-frequency resources, such as the resource 230-*a*. After transmitting the sidelink message 220, the transmitting UE 115-*a* may transmit a second sidelink control message 225 for the receiving UE 115-*b*, which may be a repetition or a retransmission of the transmitted sidelink message. In some cases, the second sidelink control message 225 may be transmitted in a second TTI different than the first TTI. The second sidelink message may be scheduled via SCI-1, SCI-2, or both, and may include an indication of the resources 230 that may have been previously used for transmitting the sidelink message 220. This indication may be in addition, or in lieu of, an indication of future resources 230, which may be sent in an SCI. In some cases, the indication may also include an RV-ID associated with the previously used resources 230, which may indicate a retransmission ID for the sidelink message.

In some cases, the transmitting UE 115-*a* may also transmit a bitmap to the receiving UE 115-*b*, which may indicate each subchannel of the previously used resources 230 and a corresponding interference level for each subchannel (e.g., each resource 230). In some cases, based on the indication, the bitmap, or both, the receiving UE 115-*b* may buffer each received data packet in resources 230 reserved by the first sidelink control message 215 including SCI (e.g., the first SCI-1) even if the SCI is not decodable. In some cases, the receiving UE may use the buffered packets for soft combining (e.g., based on the bitmap or RV-ID), which may improve network efficiency and the use of network resources.

Figure 3A:
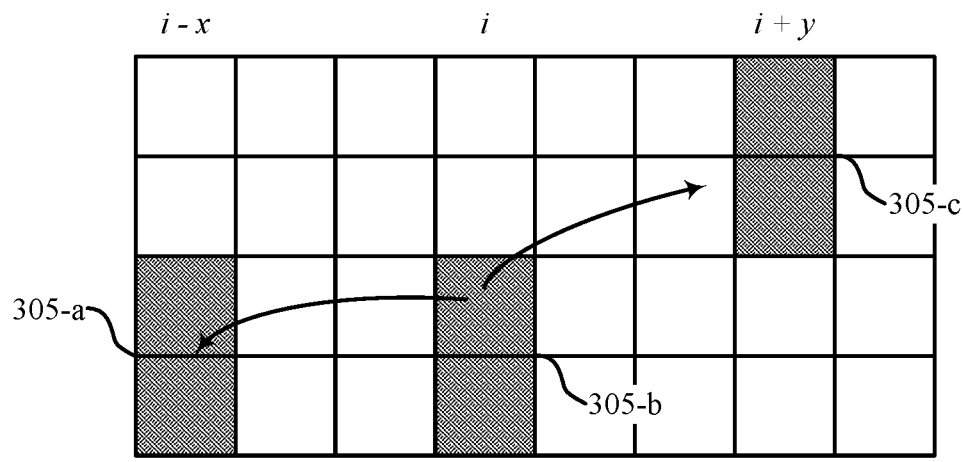
FIGS. 3A and 3B illustrate examples of resource configurations that support reserved resource indication for sidelink systems in accordance with aspects of the present disclosure.

FIG. 3A illustrates an example of a resource configuration 300-*a* that supports reserved resource indication for sidelink systems in accordance with aspects of the present disclosure. In some examples, the bitmap 300 may implement or be implemented by aspects of wireless communications systems 100 or 200 as described with reference to FIGS. 1 and 2.

To enable more efficient use of sidelink communication resources, the transmitting UE may indicate resources 305 (e.g., subchannels) for one or more previous transmissions, and the receiving UE may use the indication of resources 305 to determine whether to discard or combine data packets received via the indicated resources 305. In some cases, the receiving UE may use the indication of resources 305 as opposed to discarding data packets that may have been useful for combining, or combining data packets that may have been subject to interference at an equal weight with data packets that may not have been subject to interference.

In some cases, the transmitting UE may indicate resources 305 to the receiving UE via an SCI (e.g., SCI-1, SCI-2, or both) TDRA field. For example, the SCI may point to resources 305 in the past using a non-negative or negative time offset x and y. For example, the transmitting UE may transmit a first SCI (e.g., an SCI-1) using the resource 305-*a* in slot i−x, which may point to two future resource reservations, a resource 305-*b* in slot i and a resource 305-*c* in slot i+y. In some cases, the receiving UE may receive and decode the SCI in the resource 305-*b*, and may determine that resource 305-*b* was associated with a previous transmission for the receiving UE. If the receiving UE fails to decode the SCI in the resource 305-*b*, the receiving UE may determine that there was a previous transmission in the slot i−x and may make use of the received signal in the resource 305-*a* to perform soft combining with the SCI transmitted in the slot i (e.g., the resource 305-*b*). As such, by allowing the time offsets x and y to be negative, the receiving UE may receive indications of past and future resource reservations to allow for backward SCI indication.

In some examples, additional fields or signaling may be used to indicate the range value for the time offsets x and y. For example, the transmitting UE may use RRC signaling or PC5 signaling to indicate that the time offsets x and y may be less than zero in a number of slots. In some cases, the RRC or PC5 signaling may be some information element within a resource pool configuration (e.g., the resource configuration 300-*a*). In some cases, if any UE makes a reservation in the resource pool, then the RRC or PC5 signaling may indicate, to the UE, a corresponding subchannel configuration, the number of RBs per subchannel, and so on. In some cases, there may be an additional field (e.g., dedicated fields in the SCI or RRC signaling) associated with the resource pool such as a TRIV calculation, which may be based on the absolute value of the time offsets x and y (e.g., |x| and |y|). In some cases, the additional field may be an interpretation of a positive or negative x or y value, and as such, the receiving UE (e.g., or any number of UEs sharing the resource pool) may be able to interpret the TRIV. In some cases, the receiving UE may receive an indication (e.g., via RRC signaling) of the range of the time offsets x and y (e.g., −5<x, y≤5) and may decode the TDRA field associated with the received SCI. If the receiving UE decodes a negative TDRA value within the given x and y range, then the indication may be of resources 305 in the past.

Figure 3B:
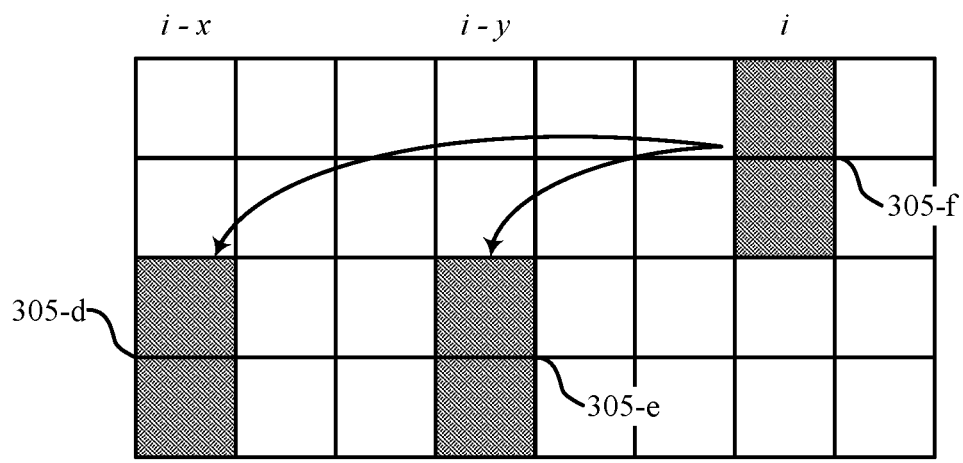

FIG. 3B illustrates an example of a resource configuration 300-*b* that supports reserved resource indication for sidelink systems in accordance with aspects of the present disclosure. In some examples, the bitmap 300 may implement or be implemented by aspects of wireless communications systems 100 or 200 as described with reference to FIGS. 1 and 2.

To enable more efficient use of sidelink communication resources, the transmitting UE may indicate resources 305 (e.g., subchannels) for one or more previous transmissions, and the receiving UE may use the indication of resources 305 to determine whether to discard or combine data packets received via the indicated resources 305. In some cases, the receiving UE may use the indication of resources 305 as opposed to discarding data packets that may have been useful for combining, or combining data packets that may have been subject to interference at an equal weight with data packets that may not have been subject to interference.

In some cases, the transmitting UE may transmit a third repetition (e.g., third transmission) of an SCI (e.g., an SCI-1) using the resource 305-*f* in the slot i. In some cases, the SCI may point to two past resource reservations, including a resource 305-*e* in the slot i−y and a resource 305-*d* in a slot i−x. In some cases, if the receiving UE fails to decode the SCI at the resource 305-*d* and the resource 305-*e*, the receiving UE may attempt to soft combine the previous transmissions together in the slot i.

In some examples, the transmitting UE may indicate past resources 305 via dedicated fields. For example, the transmitting UE may use new fields in an SCI (e.g., (N)SCI) or use a second SCI (e.g., an SCI-2) to indicate an index and a location of the past resources 305. For example, using dedicated fields, the transmitting UE may transmit an SCI (e.g., an SCI-2) in the slot i which may point to the resource 305-*e* and the resource 305-*d* in the past. In some cases, the indication may include a bitmap for each resource 305 (e.g., each subchannel), indicating which resource may be used for soft combining, or indicating an interference level for each resource 305. For example, the transmitting UE may reserve two subchannels (e.g., the resource 305-*d*) for the data channel transmission, the each of the bitmap may indicate whether each subchannel has good or poor conditions (e.g., low interference or high interference) for transmitting. In some cases, the transmitting UE may measure interference at a reserved resource 305 before transmitting to that resource 305. Based on the interference measurement, the transmitting UE may assume that the receiving UE may experience the same interference level in that reserved resource 305. In some cases, the transmitting UE indicate that interference measurement to the receiving UE. In some cases, the bitmap may indicate interference levels as shown in Table 1.

TABLE 1

| Subchannel | Indication |
|---|---|
| #1 | Good |
| #2 | Pre-empted |
| #3 | Moderate interference |
| #4 | High interference |
| #5 | Canceled |

Table 1 provides an example of the bitmap indicating an interference level for each resource 305. In some cases, one data channel (e.g., for an SCI) may occupy 5 subchannels (e.g., resources 305). The bitmap may include one indication per subchannel which may indicate the interference level for that subchannel. For example, Table 1 shows subchannel #1 may have a good interference level, subchannel #2 may be pre-empted (e.g., by a transmission from a higher priority UE), subchannel #3 may have a moderate interference level, subchannel #4 may have a high interference level, and subchannel #5 may include a canceled transmission. In some cases, the bitmap may be used by the receiving UE to as part of a soft combining procedure.

In some cases, an RV-ID may be included in a second SCI (e.g., SCI-2) for the current transmission. To indicate past reserved resources 305, it may be beneficial for the transmitting UE to include additional information for decoding for a previous transmission (e.g., an RV-ID for the previous transmission) in the first SCI or the second SCI (e.g., SCI-1 or SCI-2). In some cases, if the SCI (e.g., SCI-1) in the second transmission is not decodable by the receiving UE, any other types of SCI (e.g., SCI-2) may also not be decodable. In some cases, the receiving UE may subsequently lack knowledge of the RV-ID for the past transmissions. In some cases, the RV-ID for the given transmission may be used by the receiving UE in order to perform soft combining (e.g., if the RV-ID is unknown, the receiving UE may lack the capability to perform soft combining). As such, an indication by the transmitting UE in the first transmission (e.g., using the resource 305-*f*) may include further decoding information to the receiving UE the RV-ID for the past transmission so the receiving UE may perform soft combining, in addition to pointing to a past reserved resource 305.

In some cases, the indication of the time offset x or y may be chained (e.g., sequentially). For example, the first SCI transmission may reserve two future resources 305, an intermediate SCI transmission may point to one reserved resource 305 in the past and one reserved resource 305 in the future, and the last SCI transmission may point to two reserved resources 305 in the past.

In some examples, upon receiving an indication (e.g., of the bitmap), the receiving UE my buffer each received packet in the resources 305 reserved by the first SCI (e.g., the SCI-1), even if the first SCI is not decodable in the corresponding reserved resources 305. For example, if the first SCI transmission is received by the receiving UE in the slot i−x, the receiving UE may still buffer the signal that may have arrived, for example, 5 or 10 slots prior. If the receiving UE is later able to decode the first SCI (e.g., that points to a previous resource 305), the receiving UE may then discard the log-likelihood ratios (LLRs) received in the previous resources 305 that are indicated as poor quality (e.g., subject to high interference, pre-empted transmission). In some cases, the LLR may be a metric representing a signal quality, and may be used by the receiving UE for decoding a signal (e.g., a low LLR may indicate poor signal quality, a high LLR may indicate good signal quality). In some cases, the receiving UE may take into account an interference level indicated by the transmitting UE, and may attempt to recalculate the LLR. In some examples, the receiving UE may rescale measured LLRs based on the indicated interference level. For example, the receiving UE may calculate LLRs based on a signal-to-noise ratio (SNR) (e.g., Signal-Strength/noisePower), such that the LLR is proportional to the corresponding SNR. If the first SCI indicates an interference level, then the receiving UE may attempt to rescale (e.g., recalculate) the LLR by a factor relating to the SNR (e.g., $LLR_{new}=LLR_{old}*noisePower/(noisePower+Interference\ Level)$). In some cases, after rescaling the LLR, the receiving UE may soft combine the LLRs for each SCI transmission (e.g., $LLR_{combined}=LLR_{new,1}+LLR_2$, where $LLR_{new,1}$ may represent the rescaled version of the first SCI transmission and $LLR_2$ may represent the repeated second transmission. As such, the receiving UE may perform soft combining using the resources 305 (e.g., subchannels) that may be indicated as quality (e.g., low interference) and may discard all of the LLRs corresponding to resources 305 that may be indicated as poor (e.g., high interference level).

In some cases, the transmitting UE may transmit an "extra" (e.g., additional) SCI for grant transmission, that may not necessarily include a backwards indication. In some cases, the extra SCI may grant remaining retransmissions in the future, and as such, the receiving UE may not buffer as much. For example, the transmitting UE may utilize a standalone transmission to indicate an interference level or cancellation of a resource 305 or to point to a past, current, or future reserved resource 305. In some cases, the standalone transmission may be an extended SCI transmission (e.g., (N)SCI) or may be a new format of an SCI which may occupy a full subchannel (e.g., resource 305) for signaling indication. In some cases, to retransmit the (N)SCI, the transmitting UE may find a new resource 305 (e.g., subchannel, slot) for the transmission that may be separate from the original sequence of transmissions to grant the remaining parts. In some cases, this process may be UE transparent, or a UE may drop a received (N)SCI if multiple are received and partially overlapping.

Figure 4:
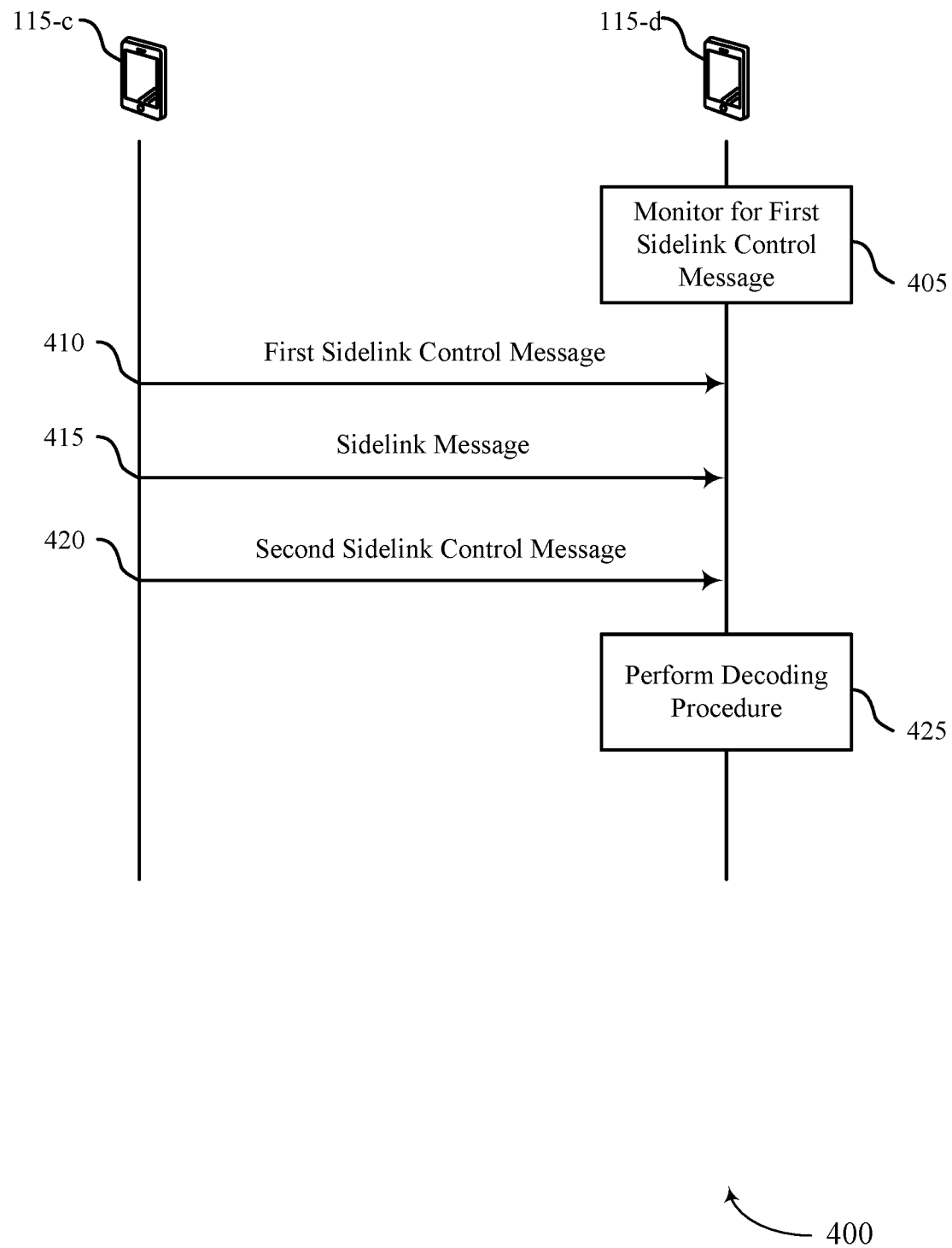
FIG. 4 illustrates an example of a process flow that supports reserved resource indication for sidelink systems in accordance with aspects of the present disclosure.

FIG. 4 illustrates an example of a process flow 400 that supports reserved resource indication for sidelink systems in accordance with aspects of the present disclosure. The process flow 400 may implement or be implemented by aspects of wireless communications system 100. For example, the process flow 400 may illustrate operations between a UE 115-*c* and a UE 115-*c*, which may be examples of a UE 115 as described with reference to FIG. 1. In the following description of the process flow 400, the operations between the UE 115-*c* and the UE 115-*c* may be transmitted in a different order than the example order shown, or the operations performed by the UE 115-*c* and the UE 115-*d* may be performed in different orders or at different times. Some operations may also be omitted from the process flow 400, and other operations may be added to the process flow 400.

At 405, the UE 115-*d* (e.g., a second UE 115-*d*) may monitor a first TTI for a first sidelink control message from the UE 115-*c* (e.g., a first UE 115-*c*). In some cases, the first sidelink control message may schedule a first set of time-frequency resources for a sidelink message for the second UE 115-*d*. For example, the first sidelink control message may include an SCI (e.g., an SCI-1) that may schedule resources (e.g., subchannels, slots) for sidelink communications.

At 410, the first UE 115-*c* may transmit, in the first TTI, a first sidelink control message to at least the second UE 115-*d*. In some cases, the first sidelink control message may include an SCI that may point to future reserved resources for the SCI transmission. In some cases, the SCI may include a bitmap that may indicate the interference level of different resources (e.g., subchannels).

At 415, the first UE 115-*c* may transmit the sidelink message to the second UE 115-*d* using the first set of time-frequency resources based on the first sidelink control message. In some cases, the sidelink message may be transmitted in a resource (e.g., subchannel, slot) that may have interference or may be pre-empted by a transmission from a higher priority UE 115.

At 420, the first UE 115-*c* may transmit, in a second TTI and after transmitting the sidelink message, a second sidelink control message to the second UE 115-*d*, the second sidelink control message indicating the first set of time-frequency resources used for transmission of the sidelink message to the second UE 115-*d*. In some cases, the second sidelink control message may include a second SCI (e.g., an SCI-2) that may include additional fields that may indicate an index and a location of the past reserved resources. In some cases, the second UE 115-*d* may use the indication to perform soft combining of different resources.

At 425, the second UE 115-*d* may perform a decoding procedure for the sidelink message based on the second sidelink control message. In some cases, the second UE 115-*d* may buffer the received sidelink message based on a buffering capability if the second UE 115-*d* is unable to decode the first SCI.

Figure 5:
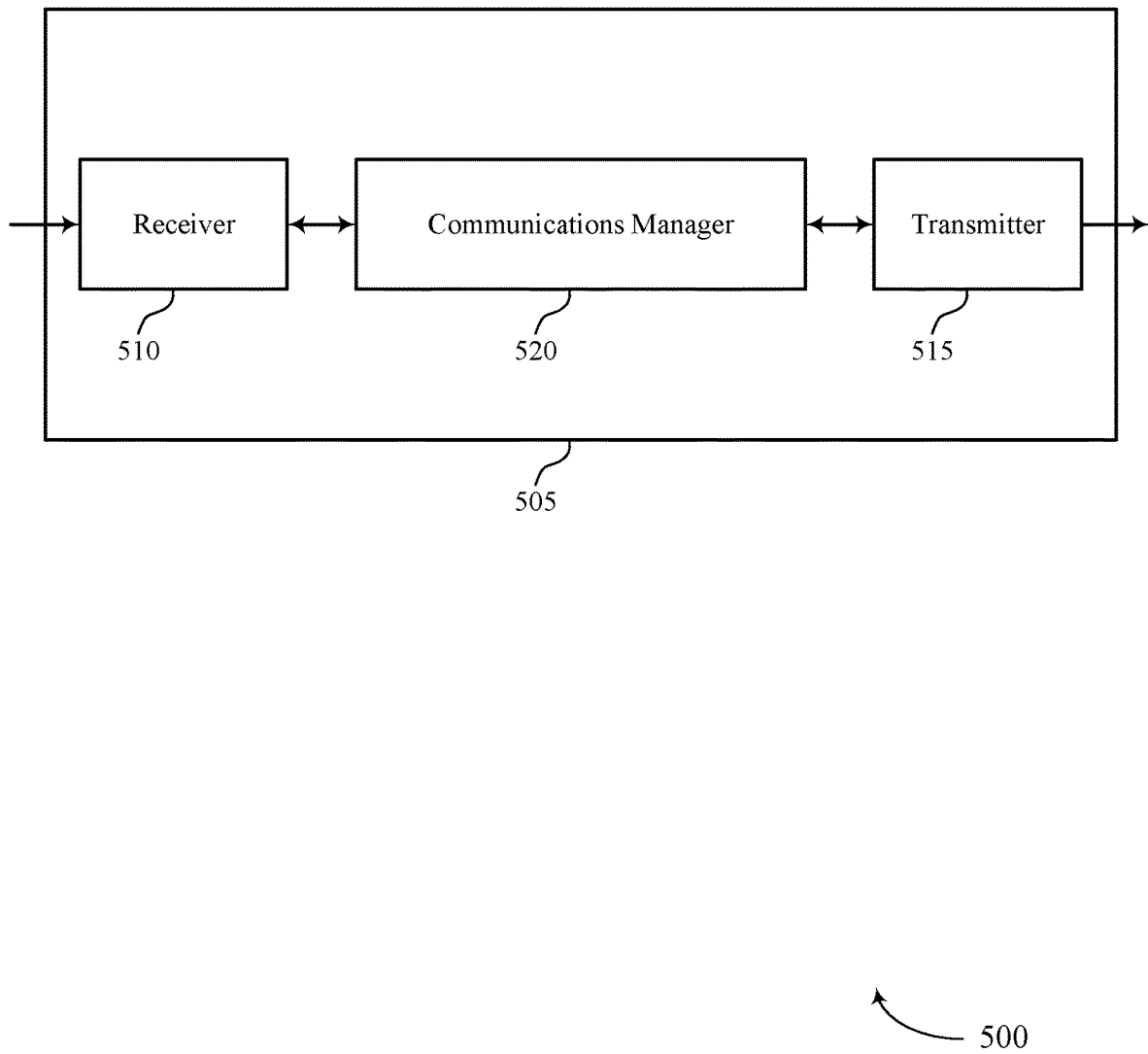
FIGS. 5 and 6 show block diagrams of devices that support reserved resource indication for sidelink systems in accordance with aspects of the present disclosure.

FIG. 5 shows a block diagram 500 of a device 505 that supports reserved resource indication for sidelink systems in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to reserved resource indication for sidelink systems). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to reserved resource indication for sidelink systems). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of reserved resource indication for sidelink systems as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a first UE in accordance with examples as disclosed herein. For example, the communications manager 520 may be configured as or otherwise support a means for transmitting, in a first TTI, a first sidelink control message to at least a second UE, the first sidelink control message scheduling a first set of time-frequency resources for a sidelink message for the second UE. The communications manager 520 may be configured as or otherwise support a means for transmitting the sidelink message to the second UE using the first set of time-frequency resources based on the first sidelink control message. The communications manager 520 may be configured as or otherwise support a means for transmitting, in a second TTI and after transmitting the sidelink message, a second sidelink control message to the second UE, the second sidelink control message indicating the first set of time-frequency resources used for transmission of the sidelink message to the second UE.

Additionally or alternatively, the communications manager 520 may support wireless communications at a first UE in accordance with examples as disclosed herein. For example, the communications manager 520 may be configured as or otherwise support a means for monitoring a first TTI for a first sidelink control message from a second UE, the first sidelink control message scheduling a first set of time-frequency resources for a sidelink message for the first UE. The communications manager 520 may be configured as or otherwise support a means for receiving, in a second TTI after the first TTI, a second sidelink control message from the second UE, the second sidelink control message indicating resources occurring before the second TTI and used for transmission of the sidelink message to the second UE. The communications manager 520 may be configured as or otherwise support a means for performing a decoding procedure for the sidelink message based on the second sidelink control message.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reserved resource indications for sidelink systems, which may improve resource utilization and lead to successful or more accurate decoding. As such, supported techniques may include improved network operations and, in some examples, may promote network efficiencies, among other benefits.

Figure 6:
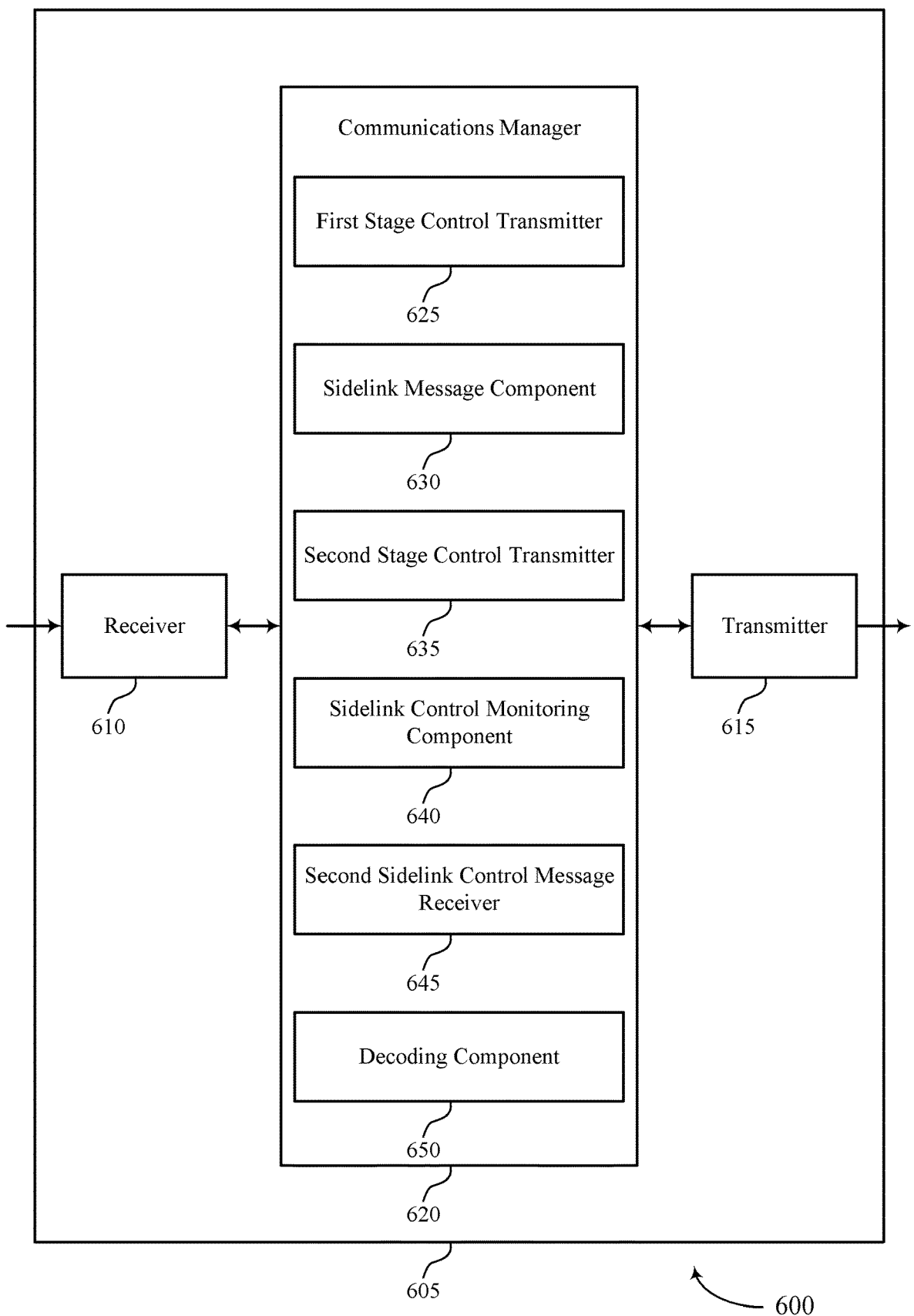

FIG. 6 shows a block diagram 600 of a device 605 that supports reserved resource indication for sidelink systems in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to reserved resource indication for sidelink systems). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to reserved resource indication for sidelink systems). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of reserved resource indication for sidelink systems as described herein. For example, the communications manager 620 may include a first stage control transmitter 625, a sidelink message component 630, a second stage control transmitter 635, a sidelink control monitoring component 640, a second sidelink control message receiver 645, a decoding component 650, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a first UE in accordance with examples as disclosed herein. The first stage control transmitter 625 may be configured as or otherwise support a means for transmitting, in a first TTI, a first sidelink control message to at least a second UE, the first sidelink control message scheduling a first set of time-frequency resources for a sidelink message for the second UE. The sidelink message component 630 may be configured as or otherwise support a means for transmitting the sidelink message to the second UE using the first set of time-frequency resources based on the first sidelink control message. The second stage control transmitter 635 may be configured as or otherwise support a means for transmitting, in a second TTI and after transmitting the sidelink message, a second sidelink control message to the second UE, the second sidelink control message indicating the first set of time-frequency resources used for transmission of the sidelink message to the second UE.

Additionally or alternatively, the communications manager 620 may support wireless communications at a first UE in accordance with examples as disclosed herein. The sidelink control monitoring component 640 may be configured as or otherwise support a means for monitoring a first TTI for a first sidelink control message from a second UE, the first sidelink control message scheduling a first set of time-frequency resources for a sidelink message for the first UE. The second sidelink control message receiver 645 may be configured as or otherwise support a means for receiving, in a second TTI after the first TTI, a second sidelink control message from the second UE, the second sidelink control message indicating resources occurring before the second TTI and used for transmission of the sidelink message to the second UE. The decoding component 650 may be configured as or otherwise support a means for performing a decoding procedure for the sidelink message based on the second sidelink control message.

Figure 7:
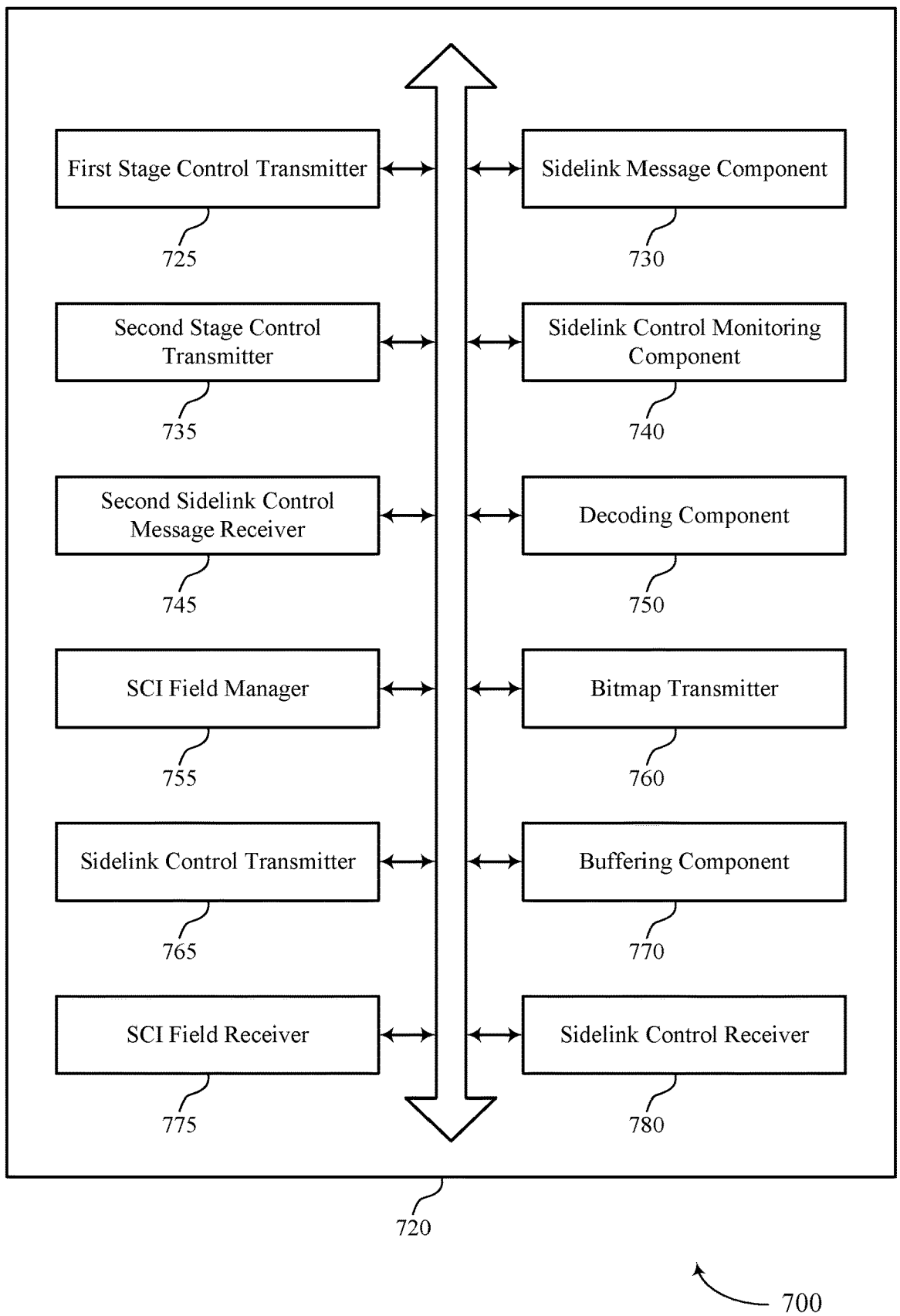
FIG. 7 shows a block diagram of a communications manager that supports reserved resource indication for sidelink systems in accordance with aspects of the present disclosure.

FIG. 7 shows a block diagram 700 of a communications manager 720 that supports reserved resource indication for sidelink systems in accordance with aspects of the present disclosure. The communications manager 720 may be an example of aspects of a communications manager 520, a communications manager 620, or both, as described herein. The communications manager 720, or various components thereof, may be an example of means for performing various aspects of reserved resource indication for sidelink systems as described herein. For example, the communications manager 720 may include a first stage control transmitter 725, a sidelink message component 730, a second stage control transmitter 735, a sidelink control monitoring component 740, a second sidelink control message receiver 745, a decoding component 750, an SCI field manager 755, a bitmap transmitter 760, a sidelink control transmitter 765, a buffering component 770, an SCI field receiver 775, a sidelink control receiver 780, or any combination thereof. Each of these components may communicate, directly or indirectly, with one another (e.g., via one or more buses).

The communications manager 720 may support wireless communications at a first UE in accordance with examples as disclosed herein. The first stage control transmitter 725 may be configured as or otherwise support a means for transmitting, in a first TTI, a first sidelink control message to at least a second UE, the first sidelink control message scheduling a first set of time-frequency resources for a sidelink message for the second UE. The sidelink message component 730 may be configured as or otherwise support a means for transmitting the sidelink message to the second UE using the first set of time-frequency resources based on the first sidelink control message. The second stage control transmitter 735 may be configured as or otherwise support a means for transmitting, in a second TTI and after transmitting the sidelink message, a second sidelink control message to the second UE, the second sidelink control message indicating the first set of time-frequency resources used for transmission of the sidelink message to the second UE.

In some examples, to support transmitting the second sidelink control message, the second stage control transmitter 735 may be configured as or otherwise support a means for transmitting an indication of a first time offset in a field of the second sidelink control message, where the first time offset indicates that the first set of time-frequency resources occur before the second TTI.

In some examples, to support transmitting the second sidelink control message, the second stage control transmitter 735 may be configured as or otherwise support a means for transmitting an indication of a second time offset in the field of the second sidelink control message, where the second time offset indicates a second set of time-frequency resources that occur after the second TTI.

In some examples, to support transmitting the second sidelink control message, the second stage control transmitter 735 may be configured as or otherwise support a means for transmitting an indication of a second time offset in the field of the second sidelink control message, where the second time offset indicates a second set of time-frequency resources that occur before the second TTI.

In some examples, the second set of time-frequency resources occur before the first set of time-frequency resources.

In some examples, to support transmitting the second sidelink control message, the second stage control transmitter 735 may be configured as or otherwise support a means for transmitting an indication of a second time offset in the field of the second sidelink control message, where the second time offset indicates a second set of time-frequency resources that occur during the second TTI.

In some examples, the SCI field manager 755 may be configured as or otherwise support a means for transmitting one or more additional fields in first stage control information or second stage control information of the first sidelink control message, the one or more additional fields indicating a range for a first time offset or a range for a second time offset, the first time offset corresponding to the first set of time-frequency resources and the second time offset corresponding to a second set of time-frequency resources different from the first set of time-frequency resources.

In some examples, the SCI field manager 755 may be configured as or otherwise support a means for transmitting one or more additional fields in first stage control information or second stage control information of the first sidelink control message or the second sidelink control message, the one or more additional fields indicating a location of the first set of time-frequency resources or a second set of time-frequency resources different from the first set of time-frequency resources.

In some examples, the one or more additional fields includes an index corresponding to the location.

In some examples, the second stage control transmitter 735 may be configured as or otherwise support a means for transmitting signaling indicating a range for a first time offset or a range for a second time offset, the first time offset corresponding to the first set of time-frequency resources and the second time offset corresponding to a second set of time-frequency resources different from the first set of time-frequency resources.

In some examples, the signaling includes RRC signaling or PC5 signaling.

In some examples, the second stage control transmitter 735 may be configured as or otherwise support a means for generating a set of bits for a time domain resource assignment field of the second sidelink control message, the set of bits indicative of a first time offset corresponding to the first set of time-frequency resources or a second time offset corresponding to a second set of time-frequency resources different from the first set of time-frequency resources.

In some examples, the bitmap transmitter 760 may be configured as or otherwise support a means for transmitting a bitmap corresponding to the first set of time-frequency resources, each bit of the bitmap indicating a respective interference level for a respective subchannel of the first set of time-frequency resources.

In some examples, the first set of time-frequency resources includes the first TTI and corresponding subchannels for the first TTI.

In some examples, to support transmitting the second sidelink control message, the second stage control transmitter 735 may be configured as or otherwise support a means for transmitting an indication of a redundancy version identifier corresponding to the sidelink message and the first set of time-frequency resources used for transmission of the sidelink message to the second UE.

In some examples, the sidelink control transmitter 765 may be configured as or otherwise support a means for transmitting, after the second sidelink control message, a third sidelink control message indicating the first set of time-frequency resources used for transmission of the sidelink message to the second UE. In some examples, the third sidelink control message is transmitted in a third TTI.

Additionally or alternatively, the communications manager 720 may support wireless communications at a first UE in accordance with examples as disclosed herein. The sidelink control monitoring component 740 may be configured as or otherwise support a means for monitoring a first TTI for a first sidelink control message from a second UE, the first sidelink control message scheduling a first set of time-frequency resources for a sidelink message for the first UE. The second sidelink control message receiver 745 may be configured as or otherwise support a means for receiving, in a second TTI after the first TTI, a second sidelink control message from the second UE, the second sidelink control message indicating resources occurring before the second TTI and used for transmission of the sidelink message to the second UE. The decoding component 750 may be configured as or otherwise support a means for performing a decoding procedure for the sidelink message based on the second sidelink control message.

In some examples, the buffering component 770 may be configured as or otherwise support a means for transmitting an indication of a buffering capability for the first UE. In some examples, the buffering component 770 may be configured as or otherwise support a means for buffering a received sidelink message in the first set of time-frequency resources scheduled by the first sidelink control message based on the buffering capability.

In some examples, to support buffering the received sidelink message, the buffering component 770 may be configured as or otherwise support a means for buffering the received sidelink message if the first sidelink control message is not decoded in the first set of time-frequency resources.

In some examples, the decoding component 750 may be configured as or otherwise support a means for discarding LLRs received in the first TTI and the second TTI that indicate interference above an interference threshold or canceled transmissions in the corresponding TTI.

In some examples, the LLRs are calculated based on one or more bits that indicate a level of interference in the corresponding TTI.

In some examples, the LLRs are calculated based on one or more scaling factors for the LLRs, the one or more scaling factors based on a level of interference in the corresponding TTI.

In some examples, the decoding component 750 may be configured as or otherwise support a means for performing soft combining of sidelink control messages in the second TTI based on the second TTI having interference below an interference threshold.

In some examples, to support receiving the second sidelink control message, the second sidelink control message receiver 745 may be configured as or otherwise support a means for receiving an indication of a first time offset in a field of the second sidelink control message, where the first time offset indicates that the first set of time-frequency resources occur before the second TTI.

In some examples, to support receiving the second sidelink control message, the second sidelink control message receiver 745 may be configured as or otherwise support a means for receiving an indication of a second time offset in the field of the second sidelink control message, where the second time offset indicates a second set of time-frequency resources that occur after the second TTI.

In some examples, to support receiving the second sidelink control message, the second sidelink control message receiver 745 may be configured as or otherwise support a means for receiving an indication of a second time offset in the field of the second sidelink control message, where the second time offset indicates a second set of time-frequency resources that occur before the second TTI.

In some examples, the second set of time-frequency resources occur before the first set of time-frequency resources.

In some examples, the SCI field receiver 775 may be configured as or otherwise support a means for receiving one or more additional fields in the first sidelink control message indicating a range for a first time offset or a range for a second time offset, the first time offset corresponding to the first set of time-frequency resources and the second time offset corresponding to a second set of time-frequency resources different from the first set of time-frequency resources.

In some examples, the SCI field receiver 775 may be configured as or otherwise support a means for receiving one or more additional fields in the first sidelink control message or the second sidelink control message, the one or more additional fields indicating a location of the first set of time-frequency resources or a second set of time-frequency resources different from the first set of time-frequency resources.

In some examples, the one or more additional fields includes an index corresponding to the location.

In some examples, the second sidelink control message receiver 745 may be configured as or otherwise support a means for receiving signaling indicating a range for a first time offset or a range for a second time offset, the first time offset corresponding to the first set of time-frequency resources and the second time offset corresponding to a second set of time-frequency resources different from the first set of time-frequency resources.

In some examples, the signaling includes RRC signaling or PC5 signaling.

In some examples, the sidelink control monitoring component 740 may be configured as or otherwise support a means for receiving a bitmap corresponding to the first set of time-frequency resources, each bit of the bitmap indicating a respective interference level for a respective subchannel of the first set of time-frequency resources.

In some examples, the first set of time-frequency resources includes the first TTI and corresponding subchannels for the first TTI.

In some examples, to support receiving the second sidelink control message, the second sidelink control message receiver 745 may be configured as or otherwise support a means for receiving an indication of a redundancy version identifier corresponding to the sidelink message and the first set of time-frequency resources used for transmission of the sidelink message to the second UE.

In some examples, the sidelink control receiver 780 may be configured as or otherwise support a means for receiving, after the second sidelink control message, a third sidelink control message indicating the first set of time-frequency resources used for transmission of the sidelink message to the second UE. In some examples, the third sidelink control message is transmitted in a third TTI.

Figure 8:
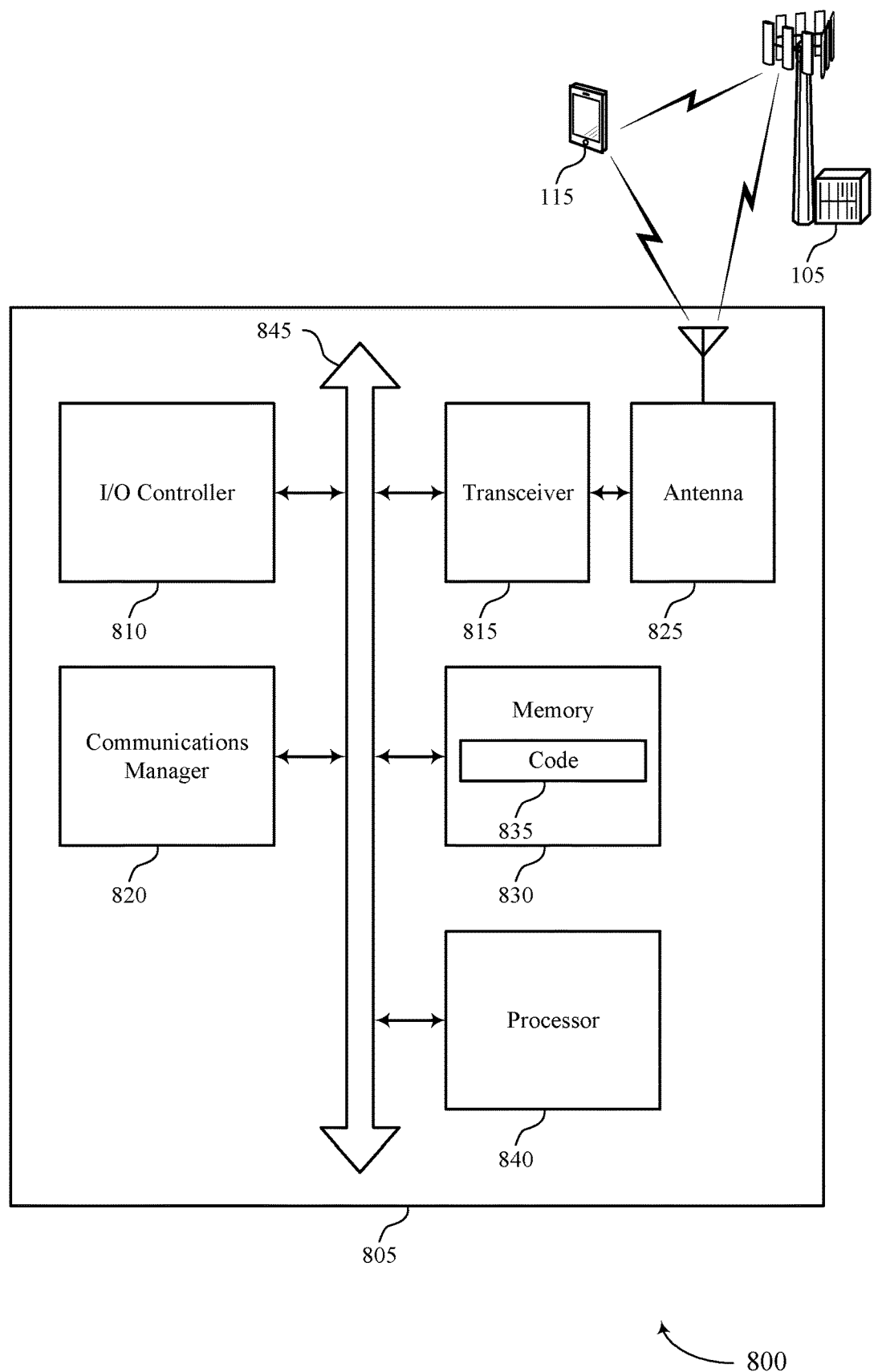
FIG. 8 shows a diagram of a system including a device that supports reserved resource indication for sidelink systems in accordance with aspects of the present disclosure.

FIG. 8 shows a diagram of a system 800 including a device 805 that supports reserved resource indication for sidelink systems in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting reserved resource indication for sidelink systems). For example, the device 805 or a component of the device 805 may include a processor 840 and memory 830 coupled to the processor 840, the processor 840 and memory 830 configured to perform various functions described herein.

The communications manager 820 may support wireless communications at a first UE in accordance with examples as disclosed herein. For example, the communications manager 820 may be configured as or otherwise support a means for transmitting, in a first TTI, a first sidelink control message to at least a second UE, the first sidelink control message scheduling a first set of time-frequency resources for a sidelink message for the second UE. The communications manager 820 may be configured as or otherwise support a means for transmitting the sidelink message to the second UE using the first set of time-frequency resources based on the first sidelink control message. The communications manager 820 may be configured as or otherwise support a means for transmitting, in a second TTI and after transmitting the sidelink message, a second sidelink control message to the second UE, the second sidelink control message indicating the first set of time-frequency resources used for transmission of the sidelink message to the second UE.

Additionally or alternatively, the communications manager 820 may support wireless communications at a first UE in accordance with examples as disclosed herein. For example, the communications manager 820 may be configured as or otherwise support a means for monitoring a first TTI for a first sidelink control message from a second UE, the first sidelink control message scheduling a first set of time-frequency resources for a sidelink message for the first UE. The communications manager 820 may be configured as or otherwise support a means for receiving, in a second TTI after the first TTI, a second sidelink control message from the second UE, the second sidelink control message indicating resources occurring before the second TTI and used for transmission of the sidelink message to the second UE. The communications manager 820 may be configured as or otherwise support a means for performing a decoding procedure for the sidelink message based on the second sidelink control message.

By including or configuring the communications manager 820 in accordance with examples as described herein, the device 805 may support techniques for reserved resource indications for sidelink systems, which may improve resource utilization and lead to successful decoding. As such, supported techniques may include improved network operations and, in some examples, may promote network efficiencies, among other benefits.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of reserved resource indication for sidelink systems as described herein, or the processor 840 and the memory 830 may be otherwise configured to perform or support such operations.

Figure 9:
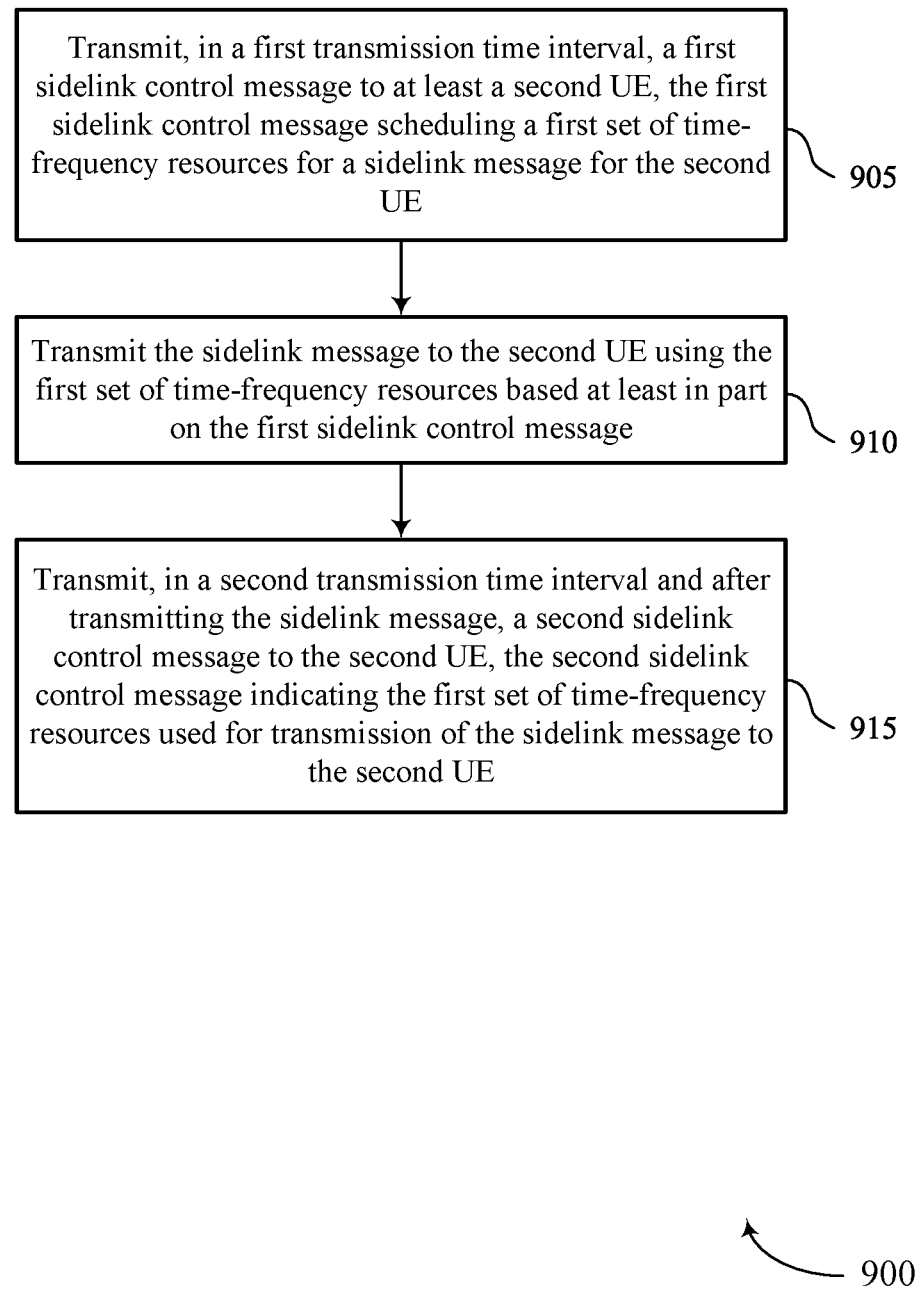
FIGS. 9 through 14 show flowcharts illustrating methods that support reserved resource indication for sidelink systems in accordance with aspects of the present disclosure.

FIG. 9 shows a flowchart illustrating a method 900 that supports reserved resource indication for sidelink systems in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include transmitting, in a first TTI, a first sidelink control message to at least a second UE, the first sidelink control message scheduling a first set of time-frequency resources for a sidelink message for the second UE. The operations of 905 may be performed in accordance with examples as disclosed herein. In some examples, aspects of the operations of 905 may be performed by a first stage control transmitter 725 as described with reference to FIG. 7.

At 910, the method may include transmitting the sidelink message to the second UE using the first set of time-frequency resources based on the first sidelink control message. The operations of 910 may be performed in accordance with examples as disclosed herein. In some examples, aspects of the operations of 910 may be performed by a sidelink message component 730 as described with reference to FIG. 7.

At 915, the method may include transmitting, in a second TTI and after transmitting the sidelink message, a second sidelink control message to the second UE, the second sidelink control message indicating the first set of time-frequency resources used for transmission of the sidelink message to the second UE. The operations of 915 may be performed in accordance with examples as disclosed herein. In some examples, aspects of the operations of 915 may be performed by a second stage control transmitter 735 as described with reference to FIG. 7.

Figure 10:
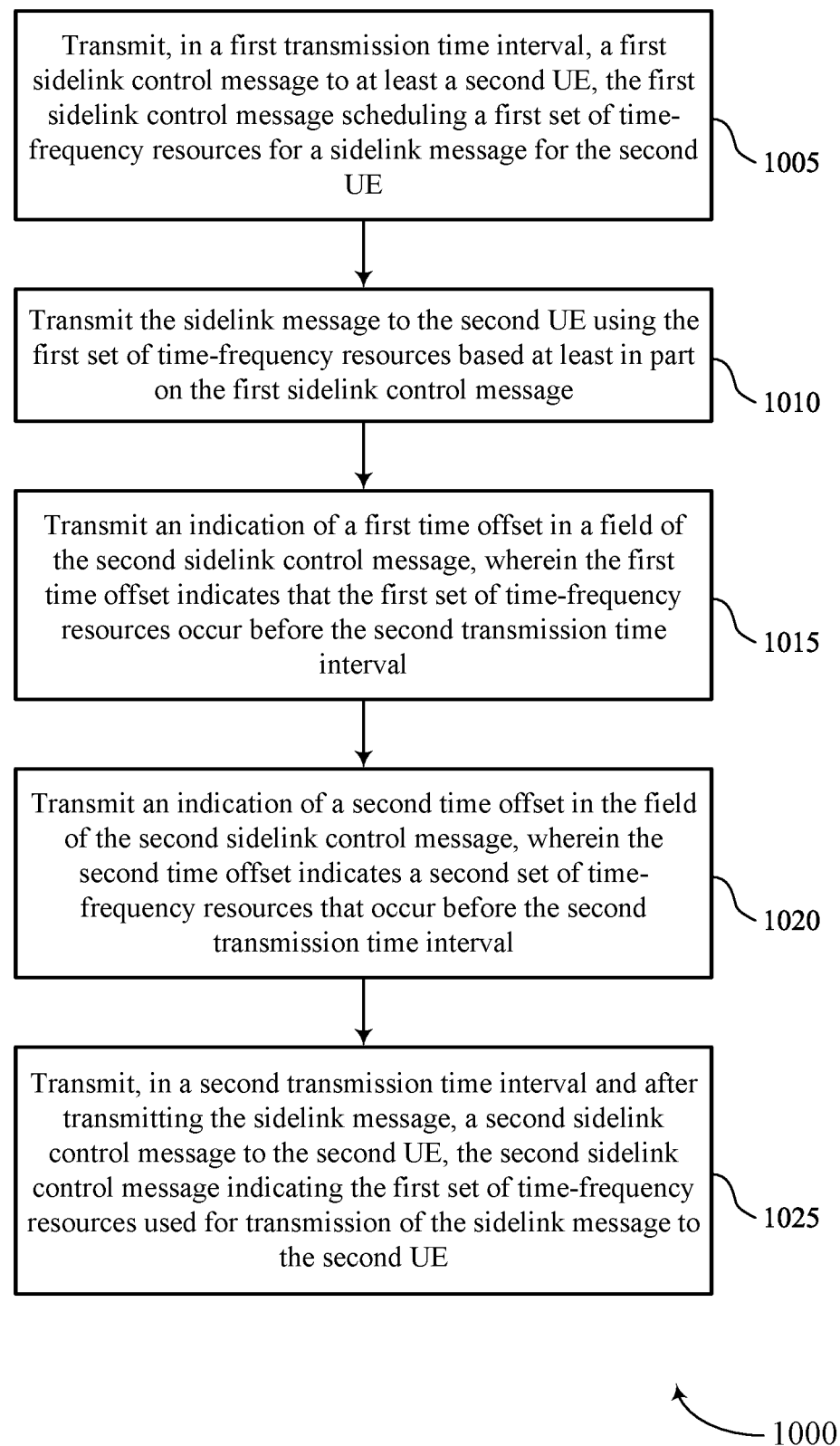

FIG. 10 shows a flowchart illustrating a method 1000 that supports reserved resource indication for sidelink systems in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include transmitting, in a first TTI, a first sidelink control message to at least a second UE, the first sidelink control message scheduling a first set of time-frequency resources for a sidelink message for the second UE. The operations of 1005 may be performed in accordance with examples as disclosed herein. In some examples, aspects of the operations of 1005 may be performed by a first stage control transmitter 725 as described with reference to FIG. 7.

At 1010, the method may include transmitting the sidelink message to the second UE using the first set of time-frequency resources based on the first sidelink control message. The operations of 1010 may be performed in accordance with examples as disclosed herein. In some examples, aspects of the operations of 1010 may be performed by a sidelink message component 730 as described with reference to FIG. 7.

At 1015, the method may include transmitting an indication of a first time offset in a field of the second sidelink control message, where the first time offset indicates that the first set of time-frequency resources occur before the second TTI. The operations of 1015 may be performed in accordance with examples as disclosed herein. In some examples, aspects of the operations of 1015 may be performed by a second stage control transmitter 735 as described with reference to FIG. 7.

At 1020, the method may include transmitting an indication of a second time offset in the field of the second sidelink control message, where the second time offset indicates a second set of time-frequency resources that occur before the second TTI. The operations of 1020 may be performed in accordance with examples as disclosed herein. In some examples, aspects of the operations of 1020 may be performed by a second stage control transmitter 735 as described with reference to FIG. 7.

At 1025, the method may include transmitting, in a second TTI and after transmitting the sidelink message, a second sidelink control message to the second UE, the second sidelink control message indicating the first set of time-frequency resources used for transmission of the sidelink message to the second UE. The operations of 1025 may be performed in accordance with examples as disclosed herein. In some examples, aspects of the operations of 1025 may be performed by a second stage control transmitter 735 as described with reference to FIG. 7.

Figure 11:
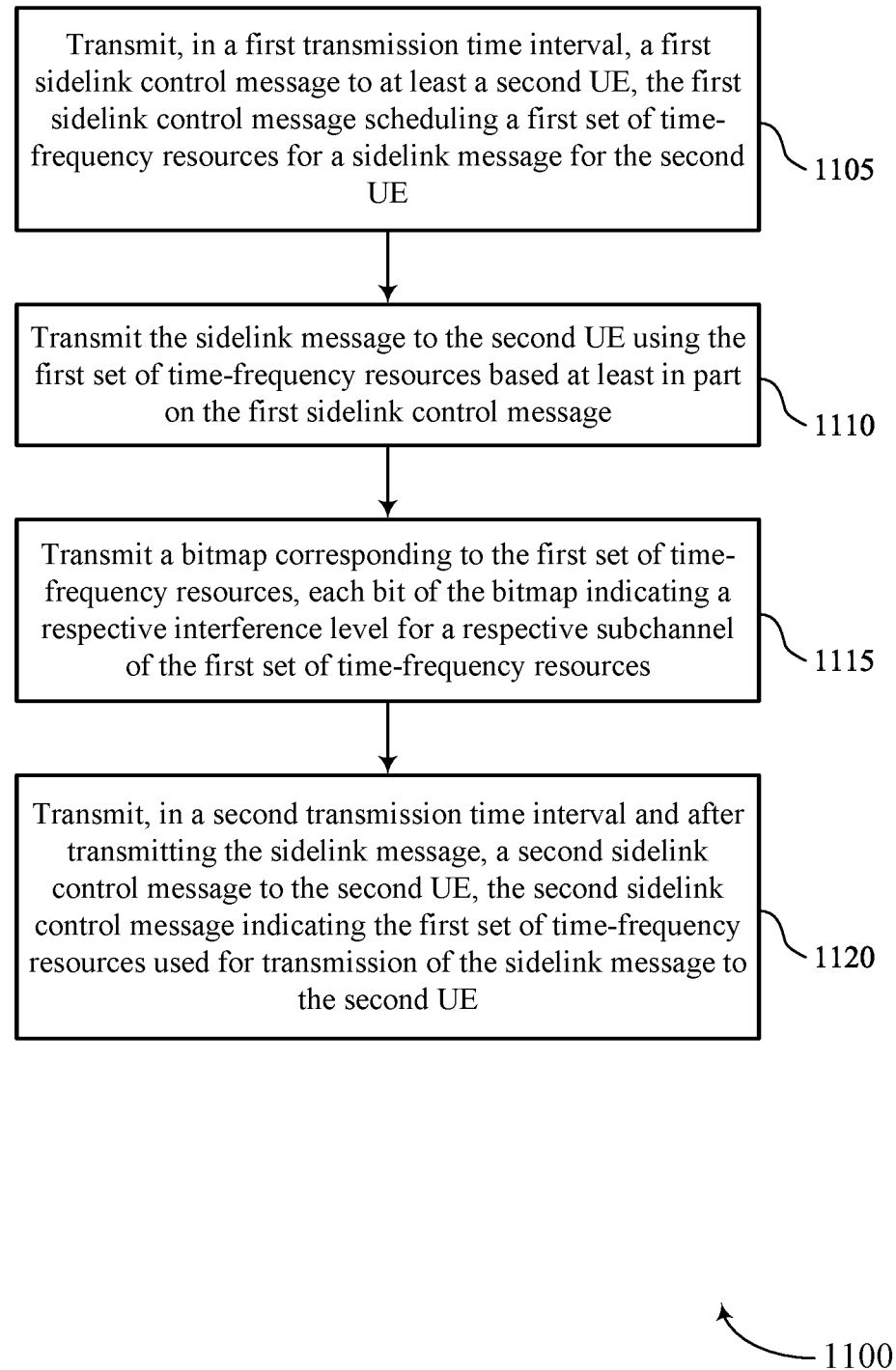

FIG. 11 shows a flowchart illustrating a method 1100 that supports reserved resource indication for sidelink systems in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include transmitting, in a first TTI, a first sidelink control message to at least a second UE, the first sidelink control message scheduling a first set of time-frequency resources for a sidelink message for the second UE. The operations of 1105 may be performed in accordance with examples as disclosed herein. In some examples, aspects of the operations of 1105 may be performed by a first stage control transmitter 725 as described with reference to FIG. 7.

At 1110, the method may include transmitting the sidelink message to the second UE using the first set of time-frequency resources based on the first sidelink control message. The operations of 1110 may be performed in accordance with examples as disclosed herein. In some examples, aspects of the operations of 1110 may be performed by a sidelink message component 730 as described with reference to FIG. 7.

At 1115, the method may include transmitting a bitmap corresponding to the first set of time-frequency resources, each bit of the bitmap indicating a respective interference level for a respective subchannel of the first set of time-frequency resources. The operations of 1115 may be performed in accordance with examples as disclosed herein. In some examples, aspects of the operations of 1115 may be performed by a bitmap transmitter 760 as described with reference to FIG. 7.

At 1120, the method may include transmitting, in a second TTI and after transmitting the sidelink message, a second sidelink control message to the second UE, the second sidelink control message indicating the first set of time-frequency resources used for transmission of the sidelink message to the second UE. The operations of 1120 may be performed in accordance with examples as disclosed herein. In some examples, aspects of the operations of 1120 may be performed by a second stage control transmitter 735 as described with reference to FIG. 7.

Figure 12:
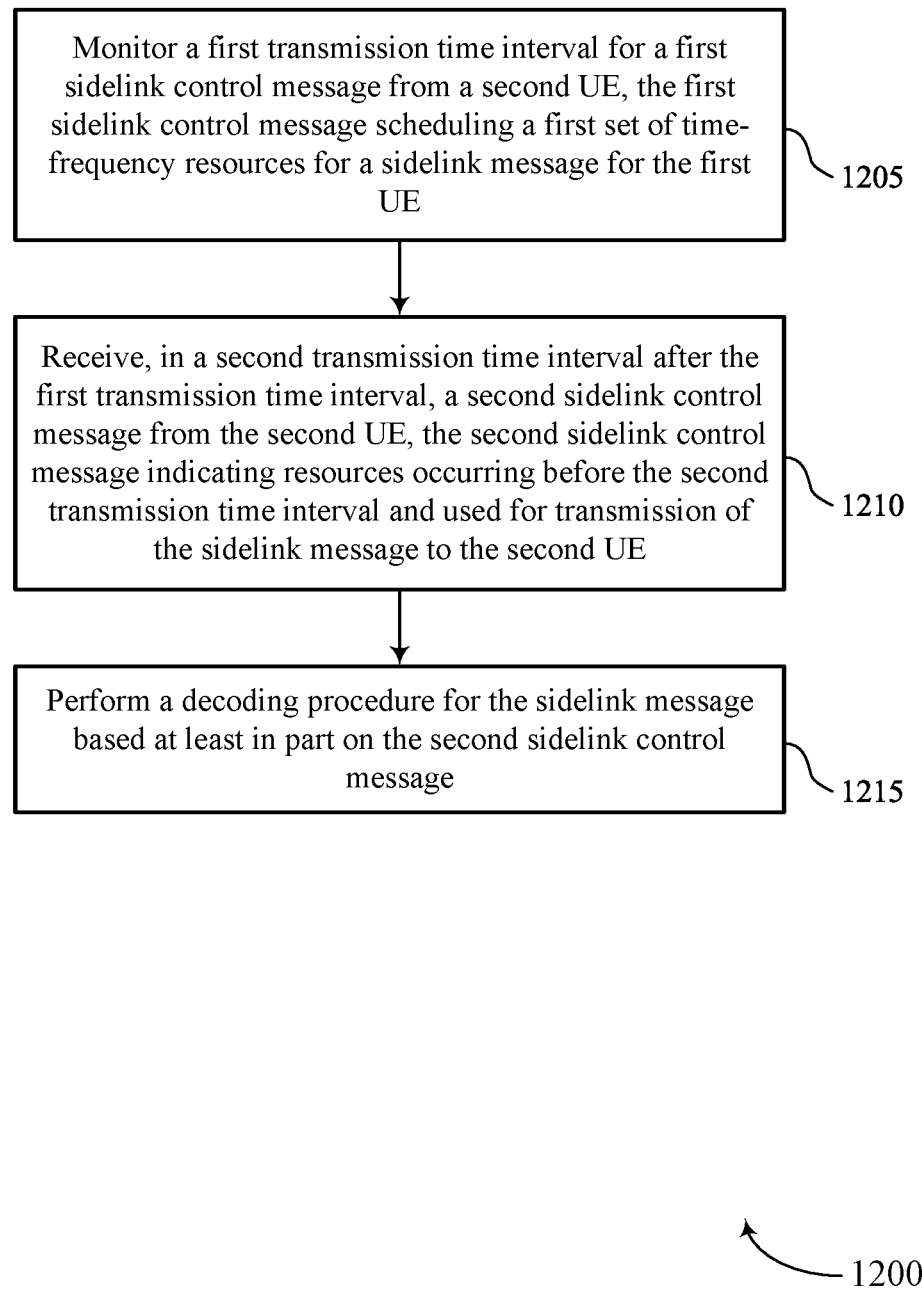

FIG. 12 shows a flowchart illustrating a method 1200 that supports reserved resource indication for sidelink systems in accordance with aspects of the present disclosure. The operations of the method 1200 may be implemented by a UE or its components as described herein. For example, the operations of the method 1200 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1205, the method may include monitoring a first TTI for a first sidelink control message from a second UE, the first sidelink control message scheduling a first set of time-frequency resources for a sidelink message for the first UE. The operations of 1205 may be performed in accordance with examples as disclosed herein. In some examples, aspects of the operations of 1205 may be performed by a sidelink control monitoring component 740 as described with reference to FIG. 7.

At 1210, the method may include receiving, in a second TTI after the first TTI, a second sidelink control message from the second UE, the second sidelink control message indicating resources occurring before the second TTI and used for transmission of the sidelink message to the second UE. The operations of 1210 may be performed in accordance with examples as disclosed herein. In some examples, aspects of the operations of 1210 may be performed by a second sidelink control message receiver 745 as described with reference to FIG. 7.

At 1215, the method may include performing a decoding procedure for the sidelink message based on the second sidelink control message. The operations of 1215 may be performed in accordance with examples as disclosed herein. In some examples, aspects of the operations of 1215 may be performed by a decoding component 750 as described with reference to FIG. 7.

Figure 13:
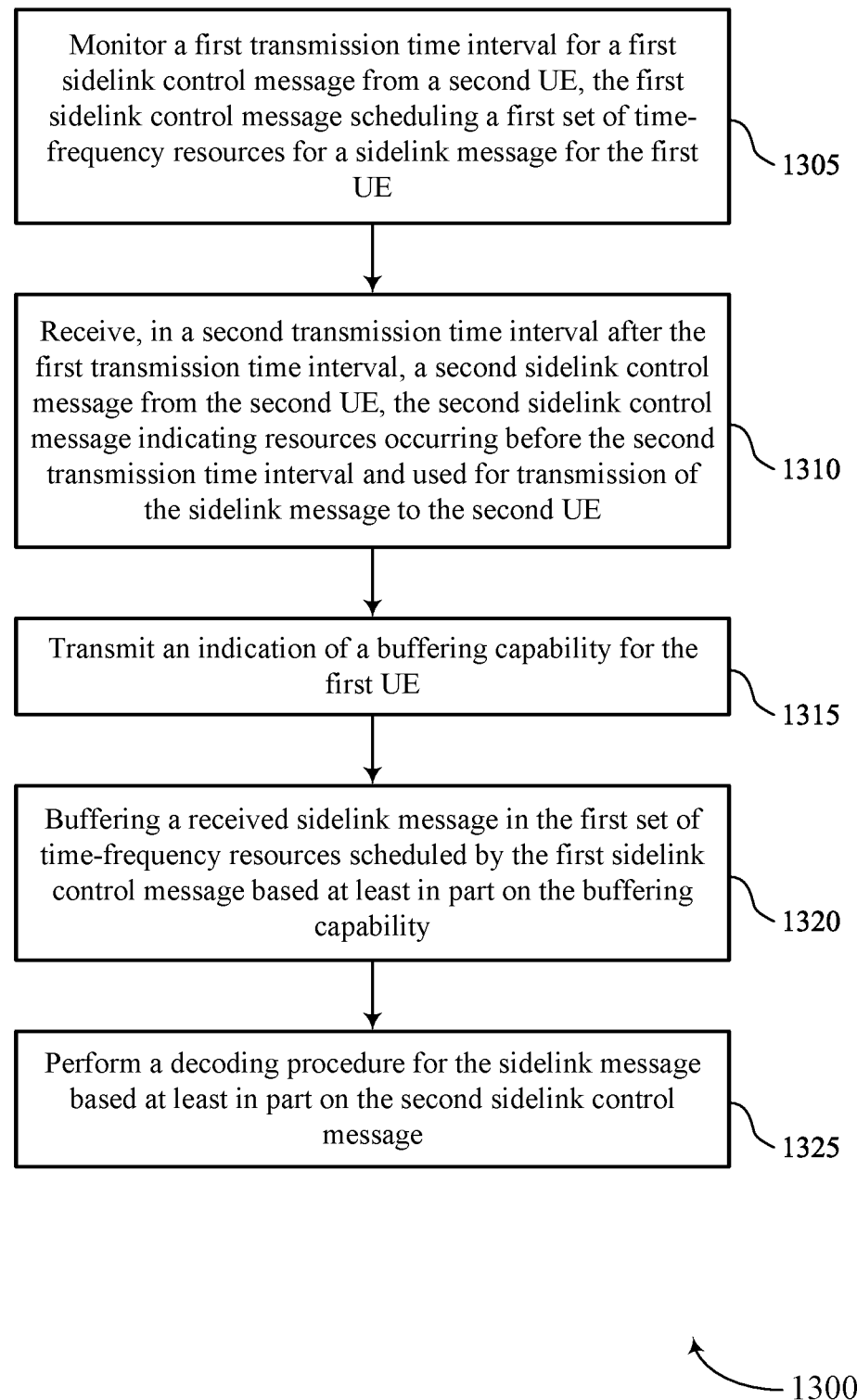

FIG. 13 shows a flowchart illustrating a method 1300 that supports reserved resource indication for sidelink systems in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include monitoring a first TTI for a first sidelink control message from a second UE, the first sidelink control message scheduling a first set of time-frequency resources for a sidelink message for the first UE. The operations of 1305 may be performed in accordance with examples as disclosed herein. In some examples, aspects of the operations of 1305 may be performed by a sidelink control monitoring component 740 as described with reference to FIG. 7.

At 1310, the method may include receiving, in a second TTI after the first TTI, a second sidelink control message from the second UE, the second sidelink control message indicating resources occurring before the second TTI and used for transmission of the sidelink message to the second UE. The operations of 1310 may be performed in accordance with examples as disclosed herein. In some examples, aspects of the operations of 1310 may be performed by a second sidelink control message receiver 745 as described with reference to FIG. 7.

At 1315, the method may include transmitting an indication of a buffering capability for the first UE. The operations of 1315 may be performed in accordance with examples as disclosed herein. In some examples, aspects of the operations of 1315 may be performed by a buffering component 770 as described with reference to FIG. 7.

At 1320, the method may include buffering a received sidelink message in the first set of time-frequency resources scheduled by the first sidelink control message based on the buffering capability. The operations of 1320 may be performed in accordance with examples as disclosed herein. In some examples, aspects of the operations of 1320 may be performed by a buffering component 770 as described with reference to FIG. 7.

At 1325, the method may include performing a decoding procedure for the sidelink message based on the second sidelink control message. The operations of 1325 may be performed in accordance with examples as disclosed herein. In some examples, aspects of the operations of 1325 may be performed by a decoding component 750 as described with reference to FIG. 7.

Figure 14:
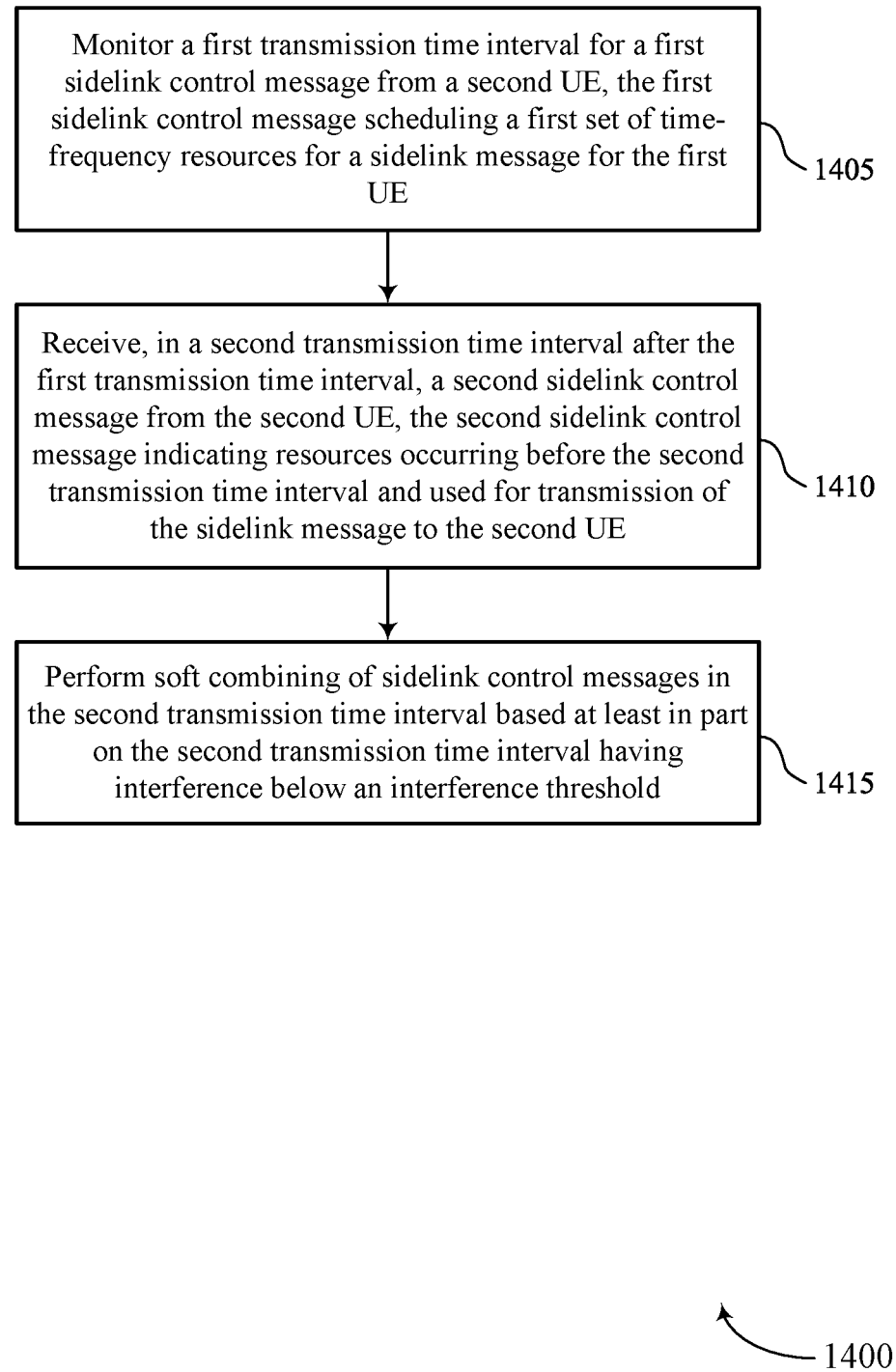

FIG. 14 shows a flowchart illustrating a method 1400 that supports reserved resource indication for sidelink systems in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include monitoring a first TTI for a first sidelink control message from a second UE, the first sidelink control message scheduling a first set of time-frequency resources for a sidelink message for the first UE. The operations of 1405 may be performed in accordance with examples as disclosed herein. In some examples, aspects of the operations of 1405 may be performed by a sidelink control monitoring component 740 as described with reference to FIG. 7.

At 1410, the method may include receiving, in a second TTI after the first TTI, a second sidelink control message from the second UE, the second sidelink control message indicating resources occurring before the second TTI and used for transmission of the sidelink message to the second UE. The operations of 1410 may be performed in accordance with examples as disclosed herein. In some examples, aspects of the operations of 1410 may be performed by a second sidelink control message receiver 745 as described with reference to FIG. 7.

At 1415, the method may include performing soft combining of sidelink control messages in the second TTI based on the second TTI having interference below an interference threshold. The operations of 1415 may be performed in accordance with examples as disclosed herein. In some examples, aspects of the operations of 1415 may be performed by a decoding component 750 as described with reference to FIG. 7.

The following provides an overview of aspects of the present disclosure:

Aspect 1: A method for wireless communications at a first UE, comprising: transmitting, in a first TTI, a first sidelink control message to at least a second UE, the first sidelink control message scheduling a first set of time-frequency resources for a sidelink message for the second UE; transmitting the sidelink message to the second UE using the first set of time-frequency resources based at least in part on the first sidelink control message; and transmitting, in a second TTI and after transmitting the sidelink message, a second sidelink control message to the second UE, the second sidelink control message indicating the first set of time-frequency resources used for transmission of the sidelink message to the second UE.

Aspect 2: The method of aspect 1, wherein transmitting the second sidelink control message comprises: transmitting an indication of a first time offset in a field of the second sidelink control message, wherein the first time offset indicates that the first set of time-frequency resources occur before the second TTI.

Aspect 3: The method of aspect 2, wherein transmitting the second sidelink control message comprises: transmitting an indication of a second time offset in the field of the second sidelink control message, wherein the second time offset indicates a second set of time-frequency resources that occur after the second TTI.

Aspect 4: The method of any of aspects 2 through 3, wherein transmitting the second sidelink control message comprises: transmitting an indication of a second time offset in the field of the second sidelink control message, wherein the second time offset indicates a second set of time-frequency resources that occur before the second TTI.

Aspect 5: The method of aspect 4, wherein the second set of time-frequency resources occur before the first set of time-frequency resources.

Aspect 6: The method of any of aspects 2 through 5, wherein transmitting the second sidelink control message comprises: transmitting an indication of a second time offset in the field of the second sidelink control message, wherein the second time offset indicates a second set of time-frequency resources that occur during the second TTI.

Aspect 7: The method of any of aspects 1 through 6, further comprising: transmitting one or more additional fields in first stage control information or second stage control information of the first sidelink control message, the one or more additional fields indicating a range for a first time offset or a range for a second time offset, the first time offset corresponding to the first set of time-frequency resources and the second time offset corresponding to a second set of time-frequency resources different from the first set of time-frequency resources.

Aspect 8: The method of any of aspects 1 through 7, further comprising: transmitting one or more additional fields in first stage control information or second stage control information of the first sidelink control message or the second sidelink control message, the one or more additional fields indicating a location of the first set of time-frequency resources or a second set of time-frequency resources different from the first set of time-frequency resources.

Aspect 9: The method of aspect 8, wherein the one or more additional fields comprises an index corresponding to the location.

Aspect 10: The method of any of aspects 1 through 9, further comprising: transmitting signaling indicating a range for a first time offset or a range for a second time offset, the first time offset corresponding to the first set of time-frequency resources and the second time offset corresponding to a second set of time-frequency resources different from the first set of time-frequency resources.

Aspect 11: The method of aspect 10, wherein the signaling comprises RRC signaling or PC5 signaling.

Aspect 12: The method of any of aspects 1 through 11, further comprising: generating a set of bits for a time domain resource assignment field of the second sidelink control message, the set of bits indicative of a first time offset corresponding to the first set of time-frequency resources or a second time offset corresponding to a second set of time-frequency resources different from the first set of time-frequency resources.

Aspect 13: The method of any of aspects 1 through 12, further comprising: transmitting a bitmap corresponding to the first set of time-frequency resources, each bit of the bitmap indicating a respective interference level for a respective subchannel of the first set of time-frequency resources.

Aspect 14: The method of aspect 13, wherein the first set of time-frequency resources comprises the first TTI and corresponding subchannels for the first TTI.

Aspect 15: The method of any of aspects 1 through 14, wherein transmitting the second sidelink control message comprises: transmitting an indication of a redundancy version identifier corresponding to the sidelink message and the first set of time-frequency resources used for transmission of the sidelink message to the second UE.

Aspect 16: The method of any of aspects 1 through 15, further comprising: transmitting, after the second sidelink control message, a third sidelink control message indicating the first set of time-frequency resources used for transmission of the sidelink message to the second UE.

Aspect 17: The method of aspect 16, wherein the third sidelink control message is transmitted in a third TTI.

Aspect 18: A method for wireless communications at a first UE, comprising: monitoring a first TTI for a first sidelink control message from a second UE, the first sidelink control message scheduling a first set of time-frequency resources for a sidelink message for the first UE; receiving, in a second TTI after the first TTI, a second sidelink control message from the second UE, the second sidelink control message indicating resources occurring before the second TTI and used for transmission of the sidelink message to the second UE; and performing a decoding procedure for the sidelink message based at least in part on the second sidelink control message.

Aspect 19: The method of aspect 18, further comprising: transmitting an indication of a buffering capability for the first UE; and buffering the received sidelink message in the first set of time-frequency resources scheduled by the first sidelink control message based at least in part on the buffering capability.

Aspect 20: The method of aspect 19, wherein buffering the received sidelink message comprises: buffering the received sidelink message if the first sidelink control message is not decoded in the first set of time-frequency resources.

Aspect 21: The method of any of aspects 18 through 20, further comprising: discarding LLRs received in the first TTI and the second TTI that indicate interference above an interference threshold or canceled transmissions in the corresponding TTI.

Aspect 22: The method of aspect 21, wherein the LLRs are calculated based at least in part on one or more bits that indicate a level of interference in the corresponding TTI.

Aspect 23: The method of any of aspects 21 through 22, wherein the LLRs are calculated based at least in part on one or more scaling factors for the LLRs, the one or more scaling factors based at least in part on a level of interference in the corresponding TTI.

Aspect 24: The method of any of aspects 18 through 23, further comprising: performing soft combining of sidelink control messages in the second TTI based at least in part on the second TTI having interference below an interference threshold.

Aspect 25: The method of any of aspects 18 through 24, wherein receiving the second sidelink control message comprises: receiving an indication of a first time offset in a field of the second sidelink control message, wherein the first time offset indicates that the first set of time-frequency resources occur before the second TTI.

Aspect 26: The method of aspect 25, wherein receiving the second sidelink control message comprises: receiving an indication of a second time offset in the field of the second sidelink control message, wherein the second time offset indicates a second set of time-frequency resources that occur after the second TTI.

Aspect 27: The method of any of aspects 25 through 26, wherein receiving the second sidelink control message comprises: receiving an indication of a second time offset in the field of the second sidelink control message, wherein the second time offset indicates a second set of time-frequency resources that occur before the second TTI.

Aspect 28: The method of aspect 27, wherein the second set of time-frequency resources occur before the first set of time-frequency resources.

Aspect 29: The method of any of aspects 18 through 28, further comprising: receiving one or more additional fields in the first sidelink control message indicating a range for a first time offset or a range for a second time offset, the first time offset corresponding to the first set of time-frequency resources and the second time offset corresponding to a second set of time-frequency resources different from the first set of time-frequency resources.

Aspect 30: The method of any of aspects 18 through 29, further comprising: receiving one or more additional fields in the first sidelink control message or the second sidelink control message, the one or more additional fields indicating a location of the first set of time-frequency resources or a second set of time-frequency resources different from the first set of time-frequency resources.

Aspect 31: The method of aspect 30, wherein the one or more additional fields comprises an index corresponding to the location.

Aspect 32: The method of any of aspects 18 through 31, further comprising: receiving signaling indicating a range for a first time offset or a range for a second time offset, the first time offset corresponding to the first set of time-frequency resources and the second time offset corresponding to a second set of time-frequency resources different from the first set of time-frequency resources.

Aspect 33: The method of aspect 32, wherein the signaling comprises RRC signaling or PC5 signaling.

Aspect 34: The method of any of aspects 18 through 33, further comprising: receiving a bitmap corresponding to the first set of time-frequency resources, each bit of the bitmap indicating a respective interference level for a respective subchannel of the first set of time-frequency resources.

Aspect 35: The method of aspect 34, wherein the first set of time-frequency resources comprises the first TTI and corresponding subchannels for the first TTI.

Aspect 36: The method of any of aspects 18 through 35, wherein receiving the second sidelink control message comprises: receiving an indication of a redundancy version identifier corresponding to the sidelink message and the first set of time-frequency resources used for transmission of the sidelink message to the second UE.

Aspect 37: The method of any of aspects 18 through 36, further comprising: receiving, after the second sidelink control message, a third sidelink control message indicating the first set of time-frequency resources used for transmission of the sidelink message to the second UE.

Aspect 38: The method of aspect 37, wherein the third sidelink control message is transmitted in a third TTI.

Aspect 39: An apparatus for wireless communications at a first UE, comprising a processor; memory coupled with the processor; and instructions stored in the memory and executable by the processor to cause the apparatus to perform a method of any of aspects 1 through 17.

Aspect 40: An apparatus for wireless communications at a first UE, comprising at least one means for performing a method of any of aspects 1 through 17.

Aspect 41: A non-transitory computer-readable medium storing code for wireless communications at a first UE, the code comprising instructions executable by a processor to perform a method of any of aspects 1 through 17.

Aspect 42: An apparatus for wireless communications at a first UE, comprising a processor; memory coupled with the processor; and instructions stored in the memory and executable by the processor to cause the apparatus to perform a method of any of aspects 18 through 38.

Aspect 43: An apparatus for wireless communications at a first UE, comprising at least one means for performing a method of any of aspects 18 through 38.

Aspect 44: A non-transitory computer-readable medium storing code for wireless communications at a first UE, the code comprising instructions executable by a processor to perform a method of any of aspects 18 through 38.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first user equipment (UE), comprising:
    transmitting, in a first transmission time interval, a first sidelink control message to at least a second UE, the first sidelink control message scheduling a first set of time-frequency resources for a sidelink message for the second UE;
    transmitting the sidelink message to the second UE using the first set of time-frequency resources based at least in part on the first sidelink control message; and
    transmitting, in a second transmission time interval different from the first transmission time interval and after transmitting the sidelink message, a second sidelink control message to the second UE, the second sidelink control message indicating the first set of time-frequency resources scheduled by the first sidelink control message and used for transmission of the sidelink message to the second UE.

2. The method of claim 1, wherein transmitting the second sidelink control message comprises:
    transmitting an indication of a first time offset in a field of the second sidelink control message, wherein the first time offset indicates that the first set of time-frequency resources occur before the second transmission time interval.

3. The method of claim 2, wherein transmitting the second sidelink control message comprises:
    transmitting an indication of a second time offset in the field of the second sidelink control message, wherein the second time offset indicates a second set of time-frequency resources that occur after the second transmission time interval.

4. The method of claim 2, wherein transmitting the second sidelink control message comprises:
    transmitting an indication of a second time offset in the field of the second sidelink control message, wherein the second time offset indicates a second set of time-frequency resources that occur before the second transmission time interval.

5. The method of claim 4, wherein the second set of time-frequency resources occur before the first set of time-frequency resources.

6. The method of claim 2, wherein transmitting the second sidelink control message comprises:
    transmitting an indication of a second time offset in the field of the second sidelink control message, wherein the second time offset indicates a second set of time-frequency resources that occur during the second transmission time interval.

7. The method of claim 1, further comprising:
    transmitting one or more additional fields in first stage control information or second stage control information of the first sidelink control message, the one or more additional fields indicating a range for a first time offset or a range for a second time offset, the first time offset corresponding to the first set of time-frequency resources and the second time offset corresponding to a second set of time-frequency resources different from the first set of time-frequency resources.

8. The method of claim 1, further comprising:
    transmitting one or more additional fields in first stage control information or second stage control information of the first sidelink control message or the second sidelink control message, the one or more additional fields indicating a location of the first set of time-frequency resources or a second set of time-frequency resources different from the first set of time-frequency resources.

9. The method of claim 8, wherein the one or more additional fields comprises an index corresponding to the location.

10. The method of claim 1, further comprising:
    transmitting signaling indicating a range for a first time offset or a range for a second time offset, the first time offset corresponding to the first set of time-frequency resources and the second time offset corresponding to a second set of time-frequency resources different from the first set of time-frequency resources.

11. The method of claim 10, wherein the signaling comprises radio resource control (RRC) signaling or PC5 signaling.

12. The method of claim 1, further comprising:
generating a set of bits for a time domain resource assignment field of the second sidelink control message, the set of bits indicative of a first time offset corresponding to the first set of time-frequency resources or a second time offset corresponding to a second set of time-frequency resources different from the first set of time-frequency resources.

13. The method of claim 1, further comprising:
transmitting a bitmap corresponding to the first set of time-frequency resources, each bit of the bitmap indicating a respective interference level for a respective subchannel of the first set of time-frequency resources.

14. The method of claim 13, wherein the first set of time-frequency resources comprises the first transmission time interval and corresponding subchannels for the first transmission time interval.

15. The method of claim 1, wherein transmitting the second sidelink control message comprises:
transmitting an indication of a redundancy version identifier corresponding to the sidelink message and the first set of time-frequency resources used for transmission of the sidelink message to the second UE.

16. The method of claim 1, further comprising:
transmitting, after the second sidelink control message, a third sidelink control message indicating the first set of time-frequency resources used for transmission of the sidelink message to the second UE.

17. The method of claim 16, wherein the third sidelink control message is transmitted in a third transmission time interval.

18. A method for wireless communications at a first user equipment (UE), comprising:
monitoring a first transmission time interval for a first sidelink control message from a second UE, the first sidelink control message scheduling a first set of time-frequency resources for a sidelink message for the first UE;
receiving, in a second transmission time interval different from the first transmission time interval and after receiving the sidelink message, a second sidelink control message from the second UE, the second sidelink control message indicating the first set of time-frequency resources scheduled by the first sidelink control message and used for transmission of the sidelink message to the second UE; and
performing a decoding procedure for the sidelink message based at least in part on the second sidelink control message.

19. The method of claim 18, further comprising:
transmitting an indication of a buffering capability for the first UE; and
buffering a received sidelink message in the first set of time-frequency resources scheduled by the first sidelink control message based at least in part on the buffering capability.

20. The method of claim 19, wherein buffering the received sidelink message comprises:
buffering the received sidelink message if the first sidelink control message is not decoded in the first set of time-frequency resources.

21. The method of claim 18, further comprising:
discarding log-likelihood ratios received in the first transmission time interval and the second transmission time interval that indicate interference above an interference threshold or canceled transmissions in a corresponding transmission time interval.

22. The method of claim 21, wherein the log-likelihood ratios are calculated based at least in part on one or more bits that indicate a level of interference in the corresponding transmission time interval.

23. The method of claim 21, wherein the log-likelihood ratios are calculated based at least in part on one or more scaling factors for the log-likelihood ratios, the one or more scaling factors based at least in part on a level of interference in the corresponding transmission time interval.

24. The method of claim 18, further comprising:
performing soft combining of sidelink control messages in the second transmission time interval based at least in part on the second transmission time interval having interference below an interference threshold.

25. The method of claim 18, wherein receiving the second sidelink control message comprises:
receiving an indication of a first time offset in a field of the second sidelink control message, wherein the first time offset indicates that the first set of time-frequency resources occur before the second transmission time interval.

26. The method of claim 25, wherein receiving the second sidelink control message comprises:
receiving an indication of a second time offset in the field of the second sidelink control message, wherein the second time offset indicates a second set of time-frequency resources that occur after the second transmission time interval.

27. The method of claim 25, wherein receiving the second sidelink control message comprises:
receiving an indication of a second time offset in the field of the second sidelink control message, wherein the second time offset indicates a second set of time-frequency resources that occur before the second transmission time interval.

28. The method of claim 27, wherein the second set of time-frequency resources occur before the first set of time-frequency resources.

29. An apparatus for wireless communications at a first user equipment (UE), comprising:
a processor;
memory coupled with the processor; and
instructions stored in the memory and executable by the processor to cause the apparatus to:
transmit, in a first transmission time interval, a first sidelink control message to at least a second UE, the first sidelink control message scheduling a first set of time-frequency resources for a sidelink message for the second UE;
transmit the sidelink message to the second UE using the first set of time-frequency resources based at least in part on the first sidelink control message; and
transmit, in a second transmission time interval different from the first transmission time interval and after transmitting the sidelink message, a second sidelink control message to the second UE, the second sidelink control message indicating the first set of time-frequency resources scheduled by the first sidelink control message and used for transmission of the sidelink message to the second UE.

30. An apparatus for wireless communications at a first user equipment (UE), comprising:
a processor;
memory coupled with the processor; and
instructions stored in the memory and executable by the processor to cause the apparatus to:
monitor a first transmission time interval for a first sidelink control message from a second UE, the first sidelink control message scheduling a first set of time-frequency resources for a sidelink message for the first UE;
receive, in a second transmission time interval different from the first transmission time interval and after receiving the sidelink message, a second sidelink control message from the second UE, the second sidelink control message indicating the first set of time-frequency resources scheduled by the first sidelink control message and used for transmission of the sidelink message to the second UE; and
perform a decoding procedure for the sidelink message based at least in part on the second sidelink control message.

\* \* \* \* \*